United States Patent
Lee et al.

(10) Patent No.: US 9,377,580 B2
(45) Date of Patent: Jun. 28, 2016

(54) SURFACE PLASMON POLARITON DEVICE INCLUDING DISCONTINUOUS WAVEGUIDE SEPARATED BY GAP, AND APPARATUS AND METHOD FOR GENERATING SURFACE PLASMON POLARITON SIGNAL USING SAME

(71) Applicant: Research & Business Foundation SUNGKYUNKWAN UNIVERSITY, Suwon-si (KR)

(72) Inventors: Myung Hyun Lee, Seoul (KR); Dong Hun Lee, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 148 days.

(21) Appl. No.: 14/501,741

(22) Filed: Sep. 30, 2014

(65) Prior Publication Data

US 2015/0093071 A1 Apr. 2, 2015

(30) Foreign Application Priority Data

Oct. 1, 2013 (KR) ........................ 10-2013-0117361

(51) Int. Cl.
  *G02B 6/35* (2006.01)
  *G02B 6/122* (2006.01)
  (Continued)

(52) U.S. Cl.
  CPC ................ *G02B 6/1226* (2013.01); *G02B 6/35* (2013.01); *G02F 1/0126* (2013.01); *H01P 1/15* (2013.01); *H01P 3/081* (2013.01); *H01P 3/082* (2013.01); *H01P 3/084* (2013.01); *H01P 5/028* (2013.01);

(Continued)

(58) Field of Classification Search
  CPC ..................... G02B 6/226; G02B 2006/12145; G02B 6/35–6/3562; G02F 1/0126; G02F 2203/10; H01P 3/08–3/084; H01P 5/02–5/028; H01P 1/10–1/15
  See application file for complete search history.

(56) References Cited

U.S. PATENT DOCUMENTS

| | | | |
|---|---|---|---|
| 8,094,317 B1 * | 1/2012 | Ptasinski | G02B 6/1226 356/445 |
| 2013/0051748 A1 * | 2/2013 | Charbon | B82Y 20/00 385/131 |

(Continued)

FOREIGN PATENT DOCUMENTS

KR 10-2004-0097119 A 11/2004

OTHER PUBLICATIONS

Chen, Jing, et al. "Surface plasmon modes of finite, planar, metal-insulator-metal plasmonic waveguides." Optics express 16.19 (2008): 14902-14909. (8 pages in English).

*Primary Examiner* — Jerry Rahll
(74) *Attorney, Agent, or Firm* — NSIP Law

(57) ABSTRACT

A plasmonic device and an apparatus and method for generating a surface plasmon polariton (SPP) mode using the plasmonic device are disclosed herein. The plasmonic device includes a first plasmonic waveguide and a second plasmonic waveguide. The first plasmonic waveguide is made of a strip-shaped metal material forming at least one pair of first metal-dielectric interfaces along with a dielectric layer, and extends from an input location to a gap start location. The second plasmonic waveguide is made of a strip-shaped metal material forming at least one pair of second metal-dielectric interfaces in planes identical to those of the at least one pair of first metal-dielectric interfaces of the first plasmonic waveguide, and extends from a gap end location, spaced apart from the gap start location by the length of a gap along the propagation direction of the SPP, to an SPP output location.

22 Claims, 13 Drawing Sheets

(51) Int. Cl.
  *H01P 3/08* (2006.01)
  *H01P 5/02* (2006.01)
  *H01P 1/15* (2006.01)
  *G02F 1/01* (2006.01)
  *G02F 2/00* (2006.01)
  *H01P 3/00* (2006.01)
  *H01P 3/12* (2006.01)

(52) U.S. Cl.
  CPC ............... *G02F 1/011* (2013.01); *G02F 2/004* (2013.01); *G02F 2201/06* (2013.01); *G02F 2203/10* (2013.01); *H01P 3/00* (2013.01); *H01P 3/08* (2013.01); *H01P 3/121* (2013.01); *H01P 5/02* (2013.01); *H04Q 2213/13003* (2013.01)

(56) References Cited

U.S. PATENT DOCUMENTS

| 2014/0133283 | A1* | 5/2014 | Maletzky | G11B 5/314 369/13.33 |
| 2014/0254981 | A1* | 9/2014 | Avouris | G02B 6/262 385/15 |
| 2015/0234138 | A1* | 8/2015 | Sorger | G02B 6/3596 385/16 |

* cited by examiner

FIG.2
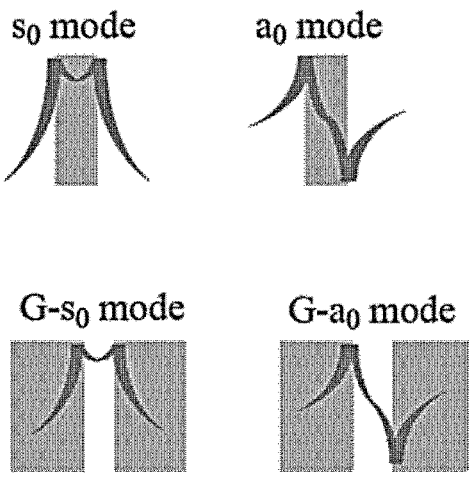
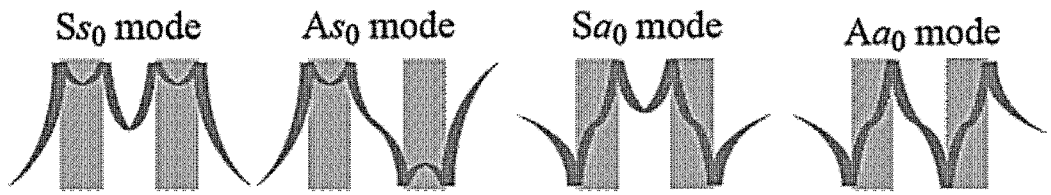
FIG.3
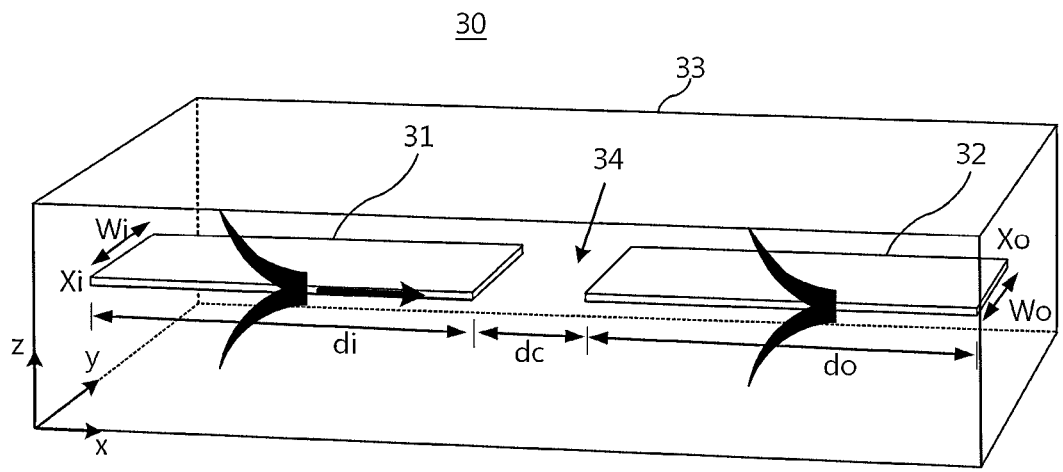

[FIG.18]
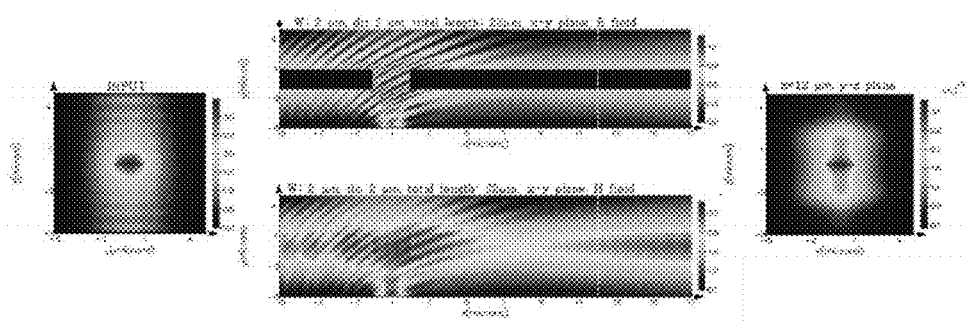
[FIG.19]
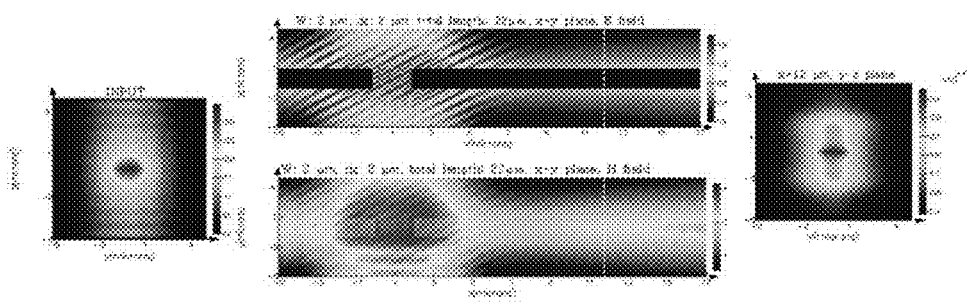

SURFACE PLASMON POLARITON DEVICE INCLUDING DISCONTINUOUS WAVEGUIDE SEPARATED BY GAP, AND APPARATUS AND METHOD FOR GENERATING SURFACE PLASMON POLARITON SIGNAL USING SAME

CROSS-REFERENCE TO RELATED APPLICATION

This application claims priority under 35 USC 119(a) from Korean Patent Application No. 10-2013-0117361, filed on Oct. 1, 2013, in the Korean Intellectual Property Office, the entire disclosures of which is incorporated herein by reference for all purposes.

BACKGROUND

1. Field

The present invention relates generally to a surface plasmon polariton (SPP) and, more particularly, to a plasmonic device.

2. Description of Related Art

A plasmon refers to a quasiparticle that is used to treat free electrons present within a metal as a single particle when the free electrons oscillate collectively under a specific condition. When a plasmon is locally confined to a surface, the plasmon is referred to as a surface plasmon.

A phenomenon in which, when light in the range from the visible band to the near-infrared band is incident on a metal surface, a surface plasmon is excited at a specific wavelength while an electric field constituting part of light is interacting with the surface plasmon is called surface plasmon resonance. This phenomenon forms a fundamental principle by which gold glitters in a unique gold color or a smooth metal surface sheds unique metallic luster.

In particular, when a surface plasmon is generated via strong interaction with a photon incident in a TM mode upon an interface between a thin metal film and a dielectric, a near field that propagates along the interface along with the surface plasmon appears. A surface wave attributable to the propagation of such a near field is treated as a single quasiparticle, and is referred to as a surface plasmon polariton (SPP).

Meanwhile, although light in the range from the visible band to the near-infrared band that is optically used in various ways generally has the advantages of high operating speed, wide bandwidth, incoherence, low loss, etc., problems with the level of integration and optical control must be overcome in order to actively use the light in the field of information technology. The problem with the level of integration arises from a fundamental limitation in which an optical wave cannot be focused within a range smaller than its wavelength, which is called the diffraction limit of light. Accordingly, in integrated optics, the limit of line width is in the range from 0.5 to 1 μm, which is significantly higher than the range from 10 to 100 nm range which can be achieved by state-of-the-art semiconductor technology.

In contrast, an SPP is capable of overcoming the diffraction limit of light because the energy of the optical wave of the SPP is highly focused within a range narrower than the wavelength of an optical wave incident from an interface between a thin metal film and a dielectric. Technology and the field of technology that deal with the implementation of devices for confining, propagating, transmitting and receiving, distributing, combining, reflecting, and filtering an SPP wave using the above-described characteristics are collectively called plasmonics.

However, plasmonics has experienced difficulties in implementing the generation, transmission and reception, transmission, duplication, amplification and switching of an SPP due to the unique rectilinear propagation property of the SPP.

SUMMARY

At least one embodiment of the present invention is directed to the provision of an SPP device including a discontinuous waveguide separated by a gap in order to utilize the rectilinear propagation property of SPP.

At least one embodiment of the present invention is directed to the provision of an apparatus and method for generating an SPP signal.

At least one embodiment of the present invention is directed to the provision of an apparatus and method for generating an SPP signal that has been modulated to have desired information.

At least one embodiment of the present invention is directed to the provision of an apparatus and method for generating an SPP signal has been modulated to have desired information using a nano surface plasmonic and photonic integrated device having a size within tens of nano meters.

The objects of the present invention are not limited to the above-described objects, and objects that have not been mentioned above will be readily understood by those skilled in the art based on the following detailed description.

In accordance with an aspect of the present invention, there is provided a plasmonic device, including a first plasmonic waveguide made of a strip-shaped metal material having at least one pair of first metal surfaces forming at least one pair of first metal-dielectric interfaces along with a dielectric layer so that a predetermined coupled mode surface plasmon polariton (SPP) can propagate, and configured to extend from an input location, at which an SPP is input, to a gap start location over a first length along the propagation direction of an excited SPP while having a predetermined width; and a second plasmonic waveguide made of a strip-shaped metal material having at least one pair of second metal surfaces forming at least one pair of second metal-dielectric interfaces in planes identical to those of the at least one pair of first metal-dielectric interfaces of the first plasmonic waveguide so that the coupled mode SPP can propagate, and configured to extend from a gap end location, spaced apart from the gap start location by the length of a gap along the propagation direction of the SPP, to an SPP output location over a second length along the propagation direction of the SPP while having a predetermined width; wherein the dielectric layer is made of a dielectric material that is capable of internally distributing a magnetic field of a TM mode SPP in an area that comes into contact with the at least one pair of first metal surfaces and at least one pair of second metal surfaces of the first and second plasmonic waveguides on the first and second metal-dielectric interfaces and an area that extends from the gap start location to the gap end location.

The first and second plasmonic waveguides may formed in one structure selected from the group consisting of an insulator-metal-insulator (IMI) structure, a metal-insulator-metal (MIM) structure and an insulator-metal-insulator-metal-insulator (IMIMI) structure.

The first and second plasmonic waveguides may be made of any one metal or an alloy of two or more metals selected from the group consisting of noble metals and transition metals.

The dielectric layer may be made of at least one dielectric material selected from the group consisting of Si, $SiO_2$, $Si_3N_4$ and a polymer.

The dielectric layer may be configured such that the dielectric constant of the area that comes into contact with the at least one pair of first metal surfaces and at least one pair of second metal surfaces of the first and second plasmonic waveguides on the first and second metal-dielectric interfaces is different from the dielectric constant of the area that extends from the gap start location to the gap end location.

In accordance with another aspect of the present invention, there is provided a plasmonic device, including a first plasmonic waveguide made of a strip-shaped metal material having at least one pair of first metal surfaces forming at least one pair of first metal-dielectric interfaces along with a dielectric layer so that a predetermined coupled mode SPP can propagate, and configured to extend from an input location, at which an SPP is input, to a gap start location over a first length along the propagation direction of an excited SPP while having a predetermined width; a second plasmonic waveguide made of a strip-shaped metal material having at least one pair of second metal surfaces forming at least one pair of second metal-dielectric interfaces in planes identical to those of the at least one pair of first metal-dielectric interfaces of the first plasmonic waveguide so that the coupled mode SPP can propagate, and configured to extend from a gap end location, spaced apart from the gap start location by the length of a gap along the propagation direction of the SPP, to an SPP output location over a second length along the propagation direction of the SPP while having a predetermined width; and a polarization light source device configured to allow light, polarized in a desired polarization mode, to be incident into the gap; wherein the dielectric layer is made of a dielectric material that is capable of internally distributing a magnetic field of a TM mode SPP in an area that comes into contact with the at least one pair of first metal surfaces and at least one pair of second metal surfaces of the first and second plasmonic waveguides on the first and second metal-dielectric interfaces and an area that extends from the gap start location to the gap end location.

In accordance with still another aspect of the present invention, there is provided an SPP switching apparatus, including a first plasmonic waveguide made of a strip-shaped metal material having at least one pair of first metal surfaces forming at least one pair of first metal-dielectric interfaces along with a dielectric layer so that a predetermined coupled mode SPP can propagate, and configured to extend from an input location, at which an SPP is input, to a gap start location over a first length along the propagation direction of an excited SPP while having a predetermined width; a second plasmonic waveguide made of a strip-shaped metal material having at least one pair of second metal surfaces forming at least one pair of second metal-dielectric interfaces in planes identical to those of the at least one pair of first metal-dielectric interfaces of the first plasmonic waveguide so that the coupled mode SPP can propagate, and configured to extend from a gap end location, spaced apart from the gap start location by the length of a gap along the propagation direction of the SPP, to an SPP output location over a second length along the propagation direction of the SPP while having a predetermined width; and a TE mode polarization light source device configured to allow polarized light to be incident into the gap so that an electric field is formed in a direction parallel with the propagation direction of the SPP; wherein the dielectric layer is made of a dielectric material that is capable of internally distributing a magnetic field of a TM mode SPP in an area that comes into contact with the at least one pair of first metal surfaces and at least one pair of second metal surfaces of the first and second plasmonic waveguides on the first and second metal-dielectric interfaces and an area that extends from the gap start location to the gap end location.

The TE mode polarization light source device may operate to emit or block TE mode-polarized light so that the TE mode-polarized light is or is not incident into the gap depending on the inverted symbol of an input symbol desired to be modulated.

The second plasmonic waveguide may output an SPP signal, modulated in accordance with the input symbol, at its output location in response to a situation in which the SPP excited in the first plasmonic waveguide is passed or blocked by the modulated TE mode-polarized light incident into the gap.

The first and second plasmonic waveguides may be formed in one structure selected from the group consisting of an IMI structure, an MIM structure and an IMIMI structure.

The first and second plasmonic waveguides may be made of any one metal or an alloy of two or more metals selected from the group consisting of noble metals and transition metals.

The dielectric layer may be made of at least one dielectric material selected from the group consisting of Si, $SiO_2$, $Si_3N_4$ and a polymer.

The dielectric layer may be configured such that the dielectric constant of the area that comes into contact with the at least one pair of first metal surfaces and at least one pair of second metal surfaces of the first and second plasmonic waveguides on the first and second metal-dielectric interfaces is different from the dielectric constant of the area that extends from the gap start location to the gap end location.

In accordance with still another aspect of the present invention, there is provided an apparatus for generating an SPP signal, including a first plasmonic waveguide made of a strip-shaped metal material having at least one pair of first metal surfaces forming at least one pair of first metal-dielectric interfaces along with a dielectric layer so that a predetermined coupled mode SPP can propagate, and configured to extend from an input location, at which an SPP is input, to a gap start location over a first length along the propagation direction of an excited SPP while having a predetermined width; a second plasmonic waveguide made of a strip-shaped metal material having at least one pair of second metal surfaces forming at least one pair of second metal-dielectric interfaces in planes identical to those of the at least one pair of first metal-dielectric interfaces of the first plasmonic waveguide so that the coupled mode SPP can propagate, and configured to extend from a gap end location, spaced apart from the gap start location by the length of a gap along the propagation direction of the SPP, to an SPP output location over a second length along the propagation direction of the SPP while having a predetermined width; and a TM mode polarization light source device configured to allow TM-mode polarized light to be incident into the gap so that an electric field is formed in a direction perpendicular to the propagation direction of the SPP; wherein the dielectric layer is made of a dielectric material that is capable of internally distributing a magnetic field of a TM mode SPP in an area that comes into contact with the at least one pair of first metal surfaces and at least one pair of second metal surfaces of the first and second plasmonic waveguides on the first and second metal-dielectric interfaces and an area that extends from the gap start location to the gap end location.

The TM mode polarization light source device may operate to emit TM mode-polarized light in accordance with a predetermined control signal so that TM mode-polarized light whose intensity has been controlled is incident into the gap.

The second plasmonic waveguide may output an SPP signal, whose intensity is controlled in accordance with the control signal, at its output location in response to a situation in which an intensity of the SPP excited in the first plasmonic waveguide is controlled by the controlled TM mode-polarized light incident into the gap.

The first and second plasmonic waveguides may be formed in one structure selected from the group consisting of an IMI structure, an MIM structure and an IMIMI structure.

The first and second plasmonic waveguides may be made of any one metal or an alloy of two or more metals selected from the group consisting of noble metals and transition metals.

The dielectric layer may be made of at least one dielectric material selected from the group consisting of Si, $SiO_2$, $Si_3N_4$ and a polymer.

The dielectric layer may be configured such that the dielectric constant of the area that comes into contact with the at least one pair of first metal surfaces and at least one pair of second metal surfaces of the first and second plasmonic waveguides on the first and second metal-dielectric interfaces is different from a dielectric constant of the area that extends from the gap start location to the gap end location.

In accordance with yet still another aspect of the present invention, there is provided a method of generating an SPP signal, including, in a plasmonic device including a first plasmonic waveguide having a first length and a second plasmonic waveguide having a second length and spaced apart from the first plasmonic waveguide by a gap having a predetermined length along the same direction, generating a predetermined coupled mode excited SPP in the first plasmonic waveguide by exciting a TM mode electromagnetic wave at the input location of the first plasmonic waveguide; TE mode-polarizing an optical signal, modulated by selectively emitting and blocking light depending on the inverted symbol of a predetermined input symbol so that an electric field is formed in parallel with the propagation direction of the excited SPP, and then allowing the TE mode-polarized optical signal to be perpendicularly incident into the gap; and outputting an SPP signal, modulated in accordance with the input symbol, at an output location of the second plasmonic waveguide, in response to a situation in which the excited SPP is selectively passed and blocked by the modulated TE mode-polarized light incident into the gap.

In accordance with yet still another aspect of the present invention, there is provided a method of generating an SPP signal, including, in a plasmonic device including a first plasmonic waveguide having a first length and a second plasmonic waveguide having a second length and spaced apart from the first plasmonic waveguide by a gap having a predetermined length along the same direction, generating a predetermined coupled mode excited SPP in the first plasmonic waveguide by exciting a TM mode electromagnetic wave at the input location of the first plasmonic waveguide; TM mode-polarizing an optical signal modulated by controlling an intensity of the optical signal in accordance with a predetermined control signal so that an electric field is formed a direction perpendicular to a propagation direction of an excited SPP, and then allowing the TM mode-polarized optical signal to be perpendicularly incident into the gap; and outputting an SPP signal controlled in accordance with the control signal at an output location of the second plasmonic waveguide in response to a situation in which the excited SPP is attenuated by the controlled TM mode-polarized light incident into the gap.

BRIEF DESCRIPTION OF THE DRAWINGS

The above and other objects, features and advantages of the present invention will be more clearly understood from the following detailed description taken in conjunction with the accompanying drawings, in which:

FIG. 2 is a conceptual diagram introducing examples of SPP modes available for an SPP device according to an embodiment of the present;

FIGS. 3 to 5 are conceptual diagrams illustrating SPP devices having three different structures, respectively, and each including a discontinuous waveguide separated by a gap according to an embodiment of the present invention;

FIGS. 18 and 19 are views each illustrating the results of simulating the propagation of an SPP in a gap in the case of allowing TM mode-polarized light to be incident into the gap of a discontinuous waveguide having an IMI structure while varying the size of the mode according to an embodiment of the present invention;

DETAILED DESCRIPTION

Figure 1:
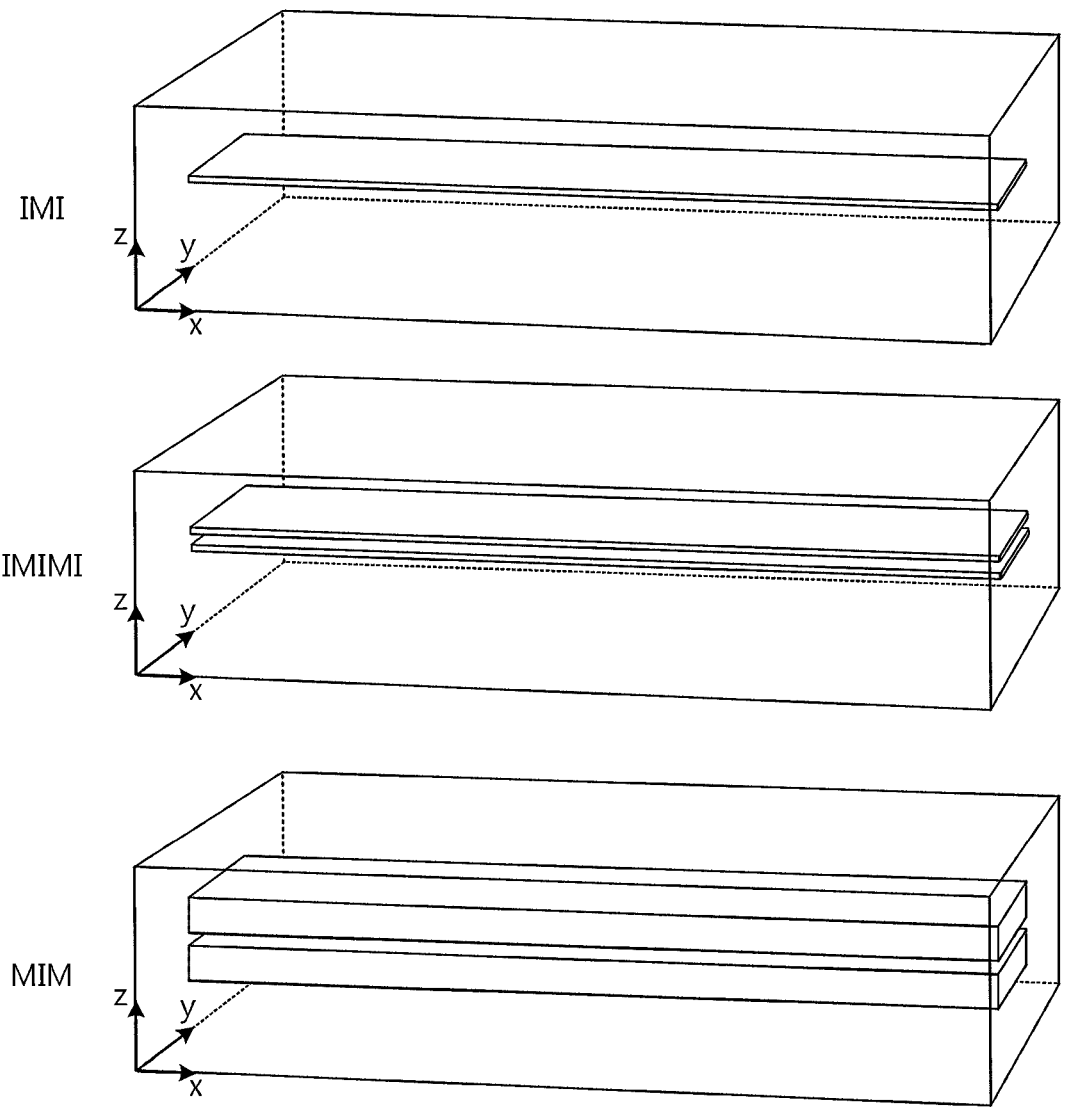
FIG. 1 is a conceptual diagram introducing examples of waveguide structures available for an SPP device according to an embodiment of the present invention.

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and descriptions of the same components will be omitted.

Prior to a description of a plasmonic waveguide, the waveguiding of an SPP needs to be described.

FIG. 1 is a conceptual diagram introducing examples of waveguide structures available for an SPP device according to an embodiment of the present invention, and FIG. 2 is a conceptual diagram introducing examples of SPP modes available for an SPP device according to an embodiment of the present.

In general, a wave vector that an SPP has is larger than the wave vector of an electromagnetic wave that is transferred by a surrounding dielectric material. Accordingly, an SPP may be electromagnetically construed as an electromagnetic wave confined within a range near a metal surface, and an SPP waveguide may be electromagnetically construed as a type of two-dimensional (2D) planar waveguide having a metal-dielectric interface as its core.

However, since the electric field of an SPP that propagates along a generally shaped metal-dielectric interface is present to a considerable depth in the inside of a propagation metal and thus suffers from a very high propagation loss, the propagation distance of the SPP is as very short as tens of μm in the visible light band.

Meanwhile, when a metal is made into a very thin film having a thickness of a few tens of nm, SPPs are generated on two surfaces of a thin metal film and then a coupled mode in which the two SPPs are spatially superposed on each other is used, the possible propagation distance of an SPP can be infinitely increased theoretically.

In general, a nano plasmonic integrated circuit (NPIC) or a plasmonic device is based on a plasmonic waveguide structure including a rectangular strip-shaped thin metal film and a dielectric layer surrounding the thin metal film when an actually available lithograph process is taken into account.

The plasmonic waveguide structure may be implemented as three types of structures: a single metal (insulator-metal-insulator (hereinafter referred to as the "IMI")) structure including a single thin metal film, a double metal (insulator-metal-insulator-metal-insulator (hereinafter referred to as the "IMIMI")) structure including two parallel thin metal films very closely formed, and a thick double metal (metal-insulator-metal (hereinafter referred to as the "MIM")) structure including parallel thick metal lines very closely formed.

Furthermore, waveguides having composite structures, for example, an IMI-IMIMI structure or an MIM-IMIMI structure, may be constructed by combining plasmonic waveguides having the above three-types of structures.

The SPP coupled mode may be classified as a symmetric mode in which the distributions of the magnetic fields of two thin film surfaces are symmetrical to each other or an anti-symmetric mode in which the distributions of the magnetic fields of two thin film surfaces are reversed around the center of a thin film, depending on the distributions of magnetic fields on two surfaces of a thin metal film.

In particular, the symmetric mode propagates in the state in which most mode energy is carried on a surrounding dielectric rather than the inside of a thin metal film, so that loss in a metal is low and thus propagation loss decreases considerably. Modes that can be propagated over a long distance, including a symmetric mode, are referred to as long-range SPP (LRSPP) modes.

Even in the case of the anti-symmetric mode, in a specific waveguide structure, the energy of an SPP propagates in the state of being carried chiefly on a core dielectric, so that propagation loss also decreases considerably, and propagation over a long distance is enabled.

Meanwhile, it is known that in an IMI structure waveguide, a long-range SPP can be excited only if the difference between the dielectric constants of both side dielectrics in contact with both interfaces of a thin metal film is equal to or less than $10^{-4}$ and thus almost the same.

In the case of an IMIMI structure waveguide, even when the dielectric constant of a core dielectric layer between two thin metal films and the dielectric constant of cladding layers outside the thin metal films are different, a long-range SPP can be excited, and the propagation loss, effective refractive index and mode distribution of a long-range SPP mode may be adjusted by adjusting the thickness or dielectric constant of the core dielectric layer.

Even in the case of an MIM structure waveguide, the characteristics of an SPP mode may be adjusted in accordance with the dielectric constant, thickness and width of a core dielectric layer between two thick metal layers.

A metal material that is used to implement a plasmonic waveguide may be selected among noble metals and transition metals.

The material of the dielectric layer may be selected among Si, $SiO_2$, $Si_3N_4$, and a polymer.

In FIG. 2, first, in an IMI waveguide, two modes, that is, an $s_0$ mode and an $a_0$ mode, are enabled. The $s_0$ mode is a symmetric mode, and has a low propagation loss. When the $s_0$ mode is implemented using a sufficiently thin metal waveguide, it has a mode size equal to that of a general optical fiber, and thus can be excited even through direct coupling (butt coupling) with an optical fiber. However, the $a_0$ mode is an anti-symmetric mode. Although the $a_0$ mode has a small size because the size of the mode is smaller than the diffraction limit of light, it has a very high propagation loss, and cannot be excited through direct coupling with an optical fiber.

Next, in an MIM waveguide, a G-$s_0$ mode and a G-$a_0$ mode are enabled. In this case, G denotes a dielectric gap between thick metal layers. It should be noted that this dielectric gap has a meaning different from the meaning of a gap that is mentioned in the other portions of the present specification.

In the case of the G-$s_0$ mode, a magnetic field is formed symmetrical with respect to the median plane of the core dielectric layer of an MIM waveguide, and a mode size is determined depending on the thickness and width of a core dielectric layer between two metal layers, so that a mode having a size smaller than the diffraction limit of light can be formed. Furthermore, since an SPP is wave-guided along a core dielectric layer, the G-$s_0$ mode has a very low propagation loss compared to the anti-symmetric mode of an IMI waveguide, thereby enabling a large-scale integrated device.

In the case of an IMIMI waveguide, an $Ss_0$ mode in which an $s_0$ mode is symmetrically formed in each of two thin metal films, an $As_0$ mode in which the $s_0$ mode of each of two thin metal films is anti-symmetrically formed, an $Sa_0$ mode in which the $a_0$ mode of each of two thin metal films is symmetrically formed, and an $Aa_0$ mode in which the $a_0$ mode of each of two thin metal films is anti-symmetrically formed are enabled.

Among these modes, the $Ss_0$ mode has a slightly smaller mode size and a slightly higher propagation loss than the $s_0$ mode of the IMI waveguide. The $s_0$ mode and the $Ss_0$ mode have the same magnetic field shape, and thus are advantageous for coupling to each other in a clad layer.

The $Sa_0$ mode has a mode size and a propagation loss similar to those of the $G$-$s_0$ mode of an MIM waveguide.

In the case of the $As_0$ mode and the $Aa_0$ mode in which a magnetic field is anti-symmetrically distributed, a very small mode can be formed, but a propagation loss is very high, which is not suitable.

Accordingly, in the remaining portion of the present specification, unless mentioned otherwise, the SPP mode should be understood as referring to a mode that belongs to the $s_0$ mode, the $G$-$s_0$ mode, the $Ss_0$ mode and the $Sa_0$ mode each having a small mode size and a low propagation loss and that is advantageous for the structure of a waveguide that is being described.

Figure 4:
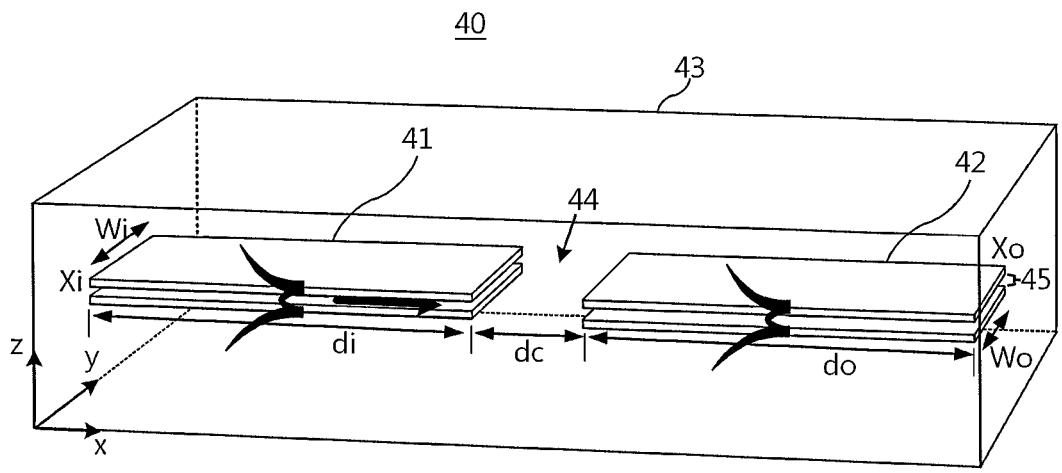
Figure 5:
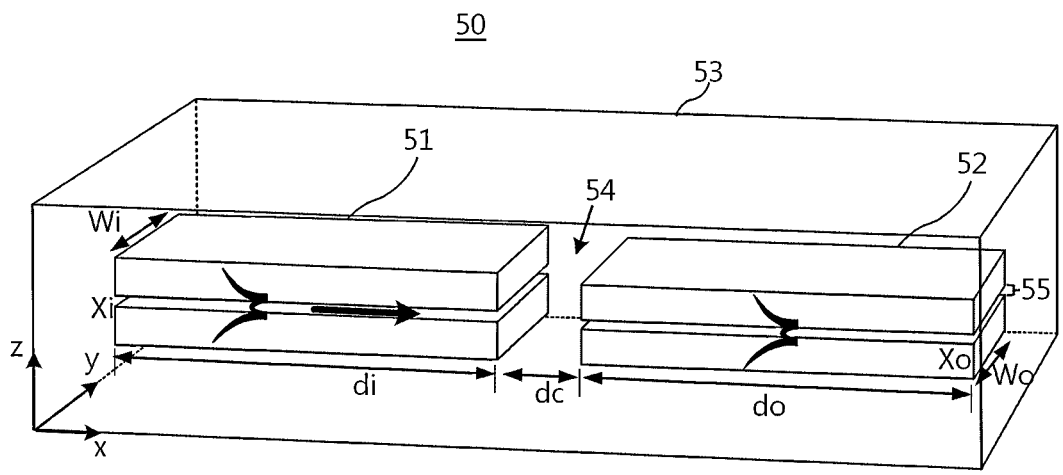

FIGS. 3 to 5 are conceptual diagrams illustrating SPP devices having three different structures, respectively, and each including a discontinuous waveguide separated by a gap according to an embodiment of the present invention.

Referring to FIG. 3, a plasmonic device including a discontinuous IMI waveguide because a gap is present at the center of a waveguide having a single thin metal film (IMI) structure is illustrated.

In general, an SPP is an electromagnetic wave that propagates along a metal-dielectric interface. Since the SPP has a strong rectilinear propagation property, it is difficult to change the propagation direction thereof or control the intensity thereof as desired. The SPP is electromagnetically an electromagnetic wave expressed by Maxwell's equations in the same manner as light, and thus it can be controlled through refraction or reflection when an optical material is utilized. However, an optical material is not practical because it is difficult to integrate and even an optical material having a variable material property available for switching requires excessively high power to cause a variation in the material property.

In contrast, plasmonic devices including discontinuous waveguides according to the present invention may perform switching and an operation of performing modulation into a desired intensity in such a way that a gap is disposed midway in the direction of extension of each waveguide and the propagation of an SPP is controlled via the gap.

A discontinuous IMI waveguide plasmonic device 30 includes a first IMI plasmonic waveguide 31 configured in the form of a flat and long strip-shaped thin metal film starting from an input location and having a width Wi, and a second IMI plasmonic waveguide 32 configured in the form of a flat and long strip-shaped thin metal film having a first length di, a width Wo, and a second length do.

The pair of first metal surfaces of the thin metal film constituting the first IMI plasmonic waveguide 31 come into contact with a clad dielectric layer 33 and then form a pair of first metal-dielectric interfaces so that a symmetric mode or anti-symmetric mode SPP can propagate.

When a TM-polarized photon is incident onto the input location Xi of the first IMI plasmonic waveguide 31, that is, when polarized light is incident such that a magnetic field is formed in parallel with the first metal-dielectric interface of the first IMI plasmonic waveguide 31, an SPP propagates in the symmetric mode $s_0$ and along the first metal-dielectric interface formed by the first IMI plasmonic waveguide 31 and the clad dielectric layer 33. For this purpose, the clad dielectric layer 33 may have a thickness to such an extent that the magnetic field of an SPP can be appropriately generated in the symmetric mode $s_0$ and a thin metal film can be physically or chemically protected.

The symbols ">" superimposed on the first and second IMI plasmonic waveguides 31 and 32 model the magnetic field distribution of a coupled mode SPP, and symbolize a coupled mode SPP that is propagating along a waveguide. The arrow indicated before a coupled mode SPP denotes the propagation direction of the SPP.

A gap 34 extends from a gap start location at which the first IMI plasmonic waveguide 31 having the first length di starting from the input location terminates to a gap end location from which the second IMI plasmonic waveguide 32 starts, and the gap 34 is filled with a dielectric over a gap length dc corresponding to the distance between the gap start location and the gap end location.

The pair of second metal surfaces of the thin metal film constituting the first IMI plasmonic waveguide 31 also come into contact with the clad dielectric layer 33 and form a pair of second metal-dielectric interfaces so that the symmetric mode or anti-symmetric mode SPP can propagate.

Next, phenomena that occur in the gap 34 are described. When the coupled mode SPP reaches the gap start location of the gap 34, a TM mode electromagnetic wave similar to an SPP is excited at the gap end location of the second IMI plasmonic waveguide 32 by the electromagnetic wave of the SPP.

It seems as if the SPP, that is, a quasiparticle, jumped across the gap 34 while passing through the dielectric material with which the area of the gap 34 had been filled and appeared again in the second IMI plasmonic waveguide 32 starting from the gap end location.

The TM mode electromagnetic wave excited into the second IMI plasmonic waveguide 32 propagate along the pair of second metal-dielectric interfaces of the second IMI plasmonic waveguide 32.

Referring to FIG. 4, a plasmonic device 40 including a discontinuous IMIMI waveguide in which a gap is present in the middle of the waveguide having a double thin metal film (IMIMI) structure is illustrated.

The plasmonic device 40 including a discontinuous IMIMI waveguide includes a first IMIMI plasmonic waveguide 41 composed of two flat and long strip-shaped adjacent thin metal films starting from an input location and having a width Wi, a first length di and a width Wo, and a second IMIMI plasmonic waveguide 42 composed of two flat and long strip-shaped adjacent thin metal films and having a second length do.

The two pairs of first metal surfaces of the pair of thin metal films constituting the first IMIMI plasmonic waveguide 41 come into contact with a clad dielectric layer 43 and a core dielectric layer 45 and form two pairs of first metal-dielectric interfaces so that a symmetric mode or anti-symmetric mode SPP can propagate.

When a TM-polarized photon is incident onto the input location Xi of the first IMIMI plasmonic waveguide 41, an SPP propagates in the symmetric mode $Ss_0$ or symmetric anti-symmetric mode $Sa_0$ and along the two pairs of first metal-dielectric interfaces that are formed by the first IMIMI plasmonic waveguide 41, the clad dielectric layer 43 and the core dielectric layer 45.

A gap 44 extends from a gap start location at which the first IMIMI plasmonic waveguide 41 having the first length di starting from the input location terminates to a gap end location from which the second IMIMI plasmonic waveguide 42 starts, and is filled with a dielectric over a gap length dc corresponding to the distance between the gap start location and the gap end location.

The two pairs of second metal surfaces of a thin metal film constituting the second IMIMI plasmonic waveguide 42 are also come into contact with the clad dielectric layer 43 and the core dielectric layer 45 and form two pairs of second metal-dielectric interfaces so that a symmetric mode or anti-symmetric mode SPP can propagate.

When the coupled mode SPP corresponding to the symmetric mode $Ss_0$ or symmetric anti-symmetric mode $Sa_0$ reaches the gap start location of the gap 44, a TM mode electromagnetic wave similar to the coupled mode SPP having been propagating along the first IMIMI plasmonic waveguide 41 is excited at the gap end location of the second IMIMI plasmonic waveguide 42 by the electromagnetic wave of the coupled mode SPP.

In the same manner, it seems as if the SPP, that is, a quasiparticle, jumped across the gap 44 while passing through the dielectric material with which the gap 44 had been filled and appeared again in the second IMIMI plasmonic waveguide 42 starting from the gap end location.

The TM mode electromagnetic wave excited into the second IMIMI plasmonic waveguide 42 propagate along the two pairs of second metal-dielectric interfaces of the second IMIMI plasmonic waveguide 42.

Furthermore, referring to FIG. 5, a plasmonic device 50 including a discontinuous MIM waveguide in which a gap is present in the middle of the waveguide having a thick double metal plate MIM structure is illustrated.

The discontinuous MIM waveguide plasmonic device 50 includes a first MIM plasmonic waveguide 51 composed of two flat, thick and long strip-shaped adjacent metal plates starting from the input location and having a width Wi and a first length di, and a second MIM plasmonic waveguide 52 composed of two flat, thick and long strip-shaped adjacent metal plates and having a width Wo and a second length do.

The pair of opposite first metal surfaces of the pair of metal plates constituting the first MIM plasmonic waveguide 51 come into contact with a core dielectric layer 55 and form a pair of first metal-dielectric interfaces so that a symmetric mode or anti-symmetric mode SPP can propagate.

When a TM-polarized photon is incident onto the input location Xi of the first MIM plasmonic waveguide 51, an SPP propagates in the gap symmetric mode $G\text{-}s_0$ and along a pair of first metal-dielectric interfaces formed by the first MIM plasmonic waveguide 51 and the core dielectric layer 55.

A gap 54 extends from a gap start location at which the first MIM plasmonic waveguide 51 having the first length di starting from the input location to a gap end location from which the second MIM plasmonic waveguide 52 starts, and is filled with an dielectric over the gap length dc corresponding to the distance between the gap start location and the gap end location.

The first MIM plasmonic waveguide 51, the second MIM plasmonic waveguide 52, and the gap 54 may be all surrounded by a clad dielectric layer 53.

The pair of opposite second metal surfaces of the pair of metal plates constituting the second MIM plasmonic waveguide 52 also come into contact with the core dielectric layer 55 and then form a pair of second metal-dielectric interfaces so that a gap-symmetric mode $G\text{-}s_0$ SPP can propagate.

When the coupled mode SPP corresponding to the gap symmetric mode $G\text{-}s_0$ reaches the gap start location of the gap 54, a TM mode electromagnetic wave similar to the coupled mode SPP having been propagating along the first MIM plasmonic waveguide 51 is excited into the gap end location of the second MIM plasmonic waveguide 52 by the electromagnetic wave of the coupled mode SPP.

As in FIGS. 3 and 4, it seems as if an SPP, that is, a quasiparticle, jumped across the gap 54 while passing through the dielectric material with which the area of the gap 54 had been filled and appeared again in the second MIM plasmonic waveguide 52 staring from the gap end location.

The TM mode electromagnetic wave excited into the second MIM plasmonic waveguide 52 propagates along the pair of second metal-dielectric interfaces of the second MIM plasmonic waveguide 52.

The discontinuous plasmonic devices 30, 40 and 50 of FIGS. 3 to 5 are described in a more general manner, as follows.

First, the first plasmonic waveguides 31, 41 and 51 are each made of a strip-shaped metal material having at least one pair of first metal surfaces forming at least one pair of first metal-dielectric interfaces along with the dielectric layer 33, 43, 45 or 55 so that a predetermined coupled mode SPP can propagate. The metal strip constituting each of the first plasmonic waveguides 31, 41 and 51 extends from the input location Xi, at which an SPP is input, to the gap start location over a first length along the propagation direction of the excited SPP while having a predetermined width (for example, Wi).

Next, the second plasmonic waveguides 32, 42 and 52 are each implemented using a strip-shaped metal material having at least one pair of second metal surfaces forming at least one pair of second metal-dielectric interfaces in planes identical to those of the at least one pair of first metal-dielectric interfaces of the corresponding first plasmonic waveguide 31, 41 or 51 so that a coupled mode SPP can propagate. Furthermore, the metal strip constituting each of the second plasmonic waveguides 32, 42 and 52 extends from a gap end location, spaced apart from the gap start location by the gap length dc along the propagation direction of an SPP, to an SPP output location Xo over a second length along the propagation direction of the SPP while having a predetermined width (for example, Wo).

The dielectric layers 33, 43, 45 and 55 are each implemented using a dielectric material that can internally distribute the magnetic field of a TM mode in an area that comes into contact with the at least one pair of first metal surfaces and at least one pair of second metal surfaces of the first and second plasmonic waveguides 31 and 32, 41 and 42, or 51 and 52 on the first and second metal-dielectric interfaces and an area that extends from the gap start location to the gap end location.

The dielectric constant of an area in which each of the dielectric layers 33, 43, 45 and 55 comes into contact with the first and second metal surfaces may be the same as or different from the dielectric constant of the area of the gap depending on the embodiment.

Figure 6:
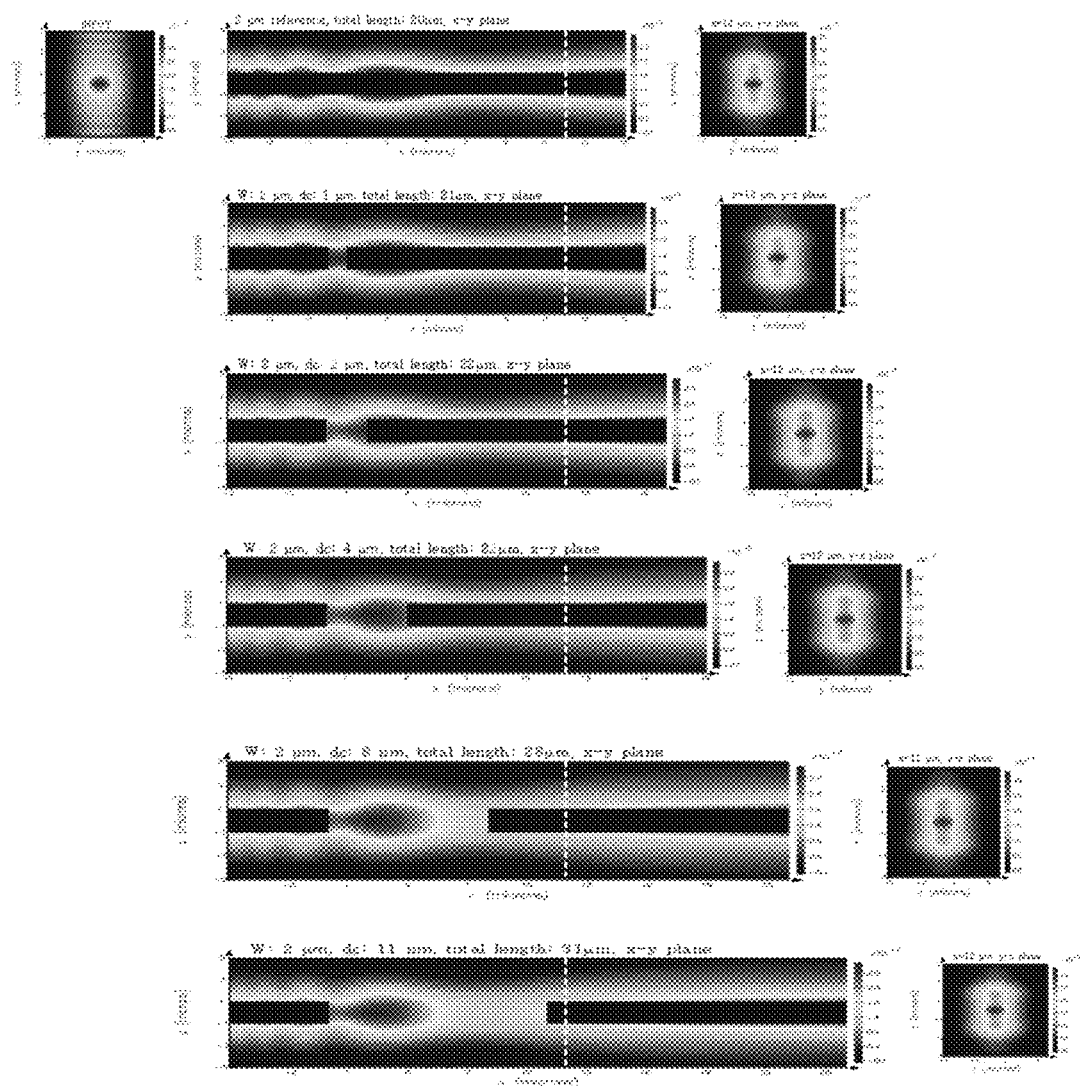
FIG. 6 shows views illustrating the results of simulating the propagation of an SPP through a gap while varying the length of the gap in an SPP device having an insulator-metal-insulator (IMI) structure and also including a discontinuous waveguide separated by the gap according to an embodiment of the present invention.

FIG. 6 shows views illustrating the results of simulating, using a finite difference time domain (FDTD) technique, the propagation of an SPP through a gap while varying the length of the gap in an SPP device having an IMI structure and also including a discontinuous waveguide separated by the gap according to an embodiment of the present invention.

Referring to FIG. 6, the simulations were performed by a method of analyzing a TM mode SPP field distribution detected at an output-side IMI plasmonic waveguide using an FDTD analysis technique while gradually increasing the gap length between two discontinuous IMI waveguides having a predetermined length.

The material of each of the metal waveguides applied to the simulations was Au, the width thereof was 2 μm, the thickness thereof was 20 nm, the first and second lengths thereof were 5 μm and 10 μm, respectively, the thickness and refractive index of the dielectric layer are 30 μm and 1.45, respectively, and the wavelength of incident light was 1.55 μm.

The length of the gap was selected as 0, 1 μm, 2 μm, 4 μm, 8 μm, and 11 μm. In the following views, in each case, the total length of the discontinuous plasmonic device is a length obtained by adding the length of the gap to the lengths of the two metal waveguides, and thus it should be noted that the total lengths of the simulations are different from each other.

The following views show the discontinuous waveguides when viewed from the above. The optical wave input location is −5 μm, the termination location of the input-side waveguide is 0 μm, that is, an origin, and the output location of the output-side waveguide is (15 μm+the length of the gap).

A case where the length of a gap is 0 corresponds to a case where there is actually no gap, and may be used as a reference. It can be seen that an SPP come to have the same shape as an $s_0$ mode SPP initially excited into an input-side plasmonic waveguide after a 12 μm point on a lateral axis and thus become stable.

When the length of the gap was 1 μm, a strong field was formed in the gap, and an SPP was excited into an output-side plasmonic waveguide. It can be seen that an $s_0$ mode SPP observed at a 12 μm point on a lateral axis is not significantly different from that when the gap is 0.

Even when the lengths of the gap were 2 μm and 4 μm, a strong field was formed in the gap and an SPP was excited into the output-side plasmonic waveguide. It can be seen that an $s_0$ mode SPP observed at a 12 μm point on a lateral axis is not significantly different from that when the gap is 0.

Even when the length of the gap was 8 μm, a strong field was still formed in the gap and an SPP was excited into the output-side plasmonic waveguide. It can be seen that an $s_0$ mode SPP observed at a 12 μm point on a lateral axis is not significantly different from that when the gap is 0.

Even when the length of the gap was 11 μm, a strong field was also formed in the gap and an SPP was excited into the output-side plasmonic waveguide. It can be seen that an $s_0$ mode SPP observed at a 12 μm point on a lateral axis has a somewhat weak intensity compared to that when the gap is 0, but has a shape that is not significantly different from that when the gap is 0.

This implies that an SPP can be propagated without a reduction in performance even when the length of a gap is considerably larger than the width of a corresponding waveguide and that the design of appearance parameters, such as the distance between two plasmonic waveguides (a gap length) or the shape of a termination portion, can be considerably flexibly determined depending on the need and situation.

Figure 7:
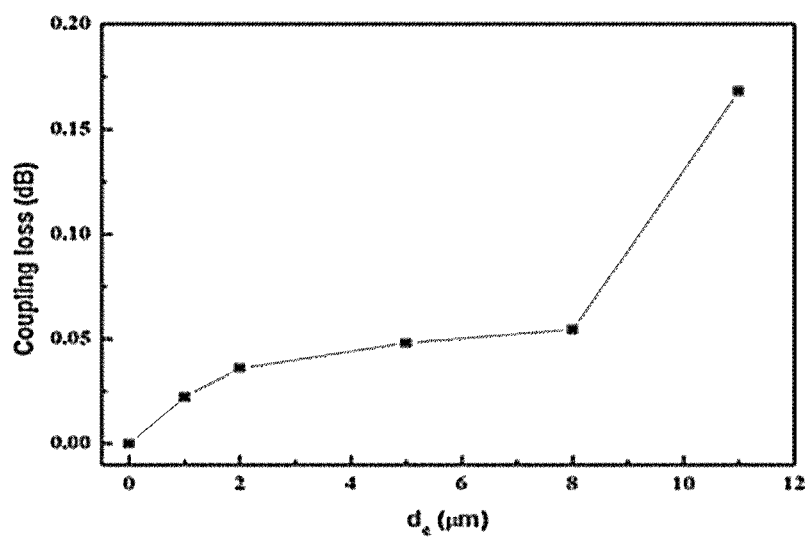
FIG. 7 is a graph illustrating coupling loss in the case of performing simulations while varying the length of a gap in an SPP device having an IMI structure and also including a discontinuous waveguide separated by a gap according to an embodiment of the present invention.

FIG. 7 is a graph illustrating coupling loss in the case of performing simulations while varying the length of a gap in an SPP device having an IMI structure and also including a discontinuous waveguide separated by a gap according to an embodiment of the present invention.

Referring to FIG. 7, the coupling loss of an SPP based on the length of the gap was maintained at a very small value ranging from about 0.02 to 0.05 dB in the range of lengths of the gap from 2 μm to 8 μm, but gradually increased. When the length of the gap was 11 μm, the coupling loss abruptly increased and become about 0.17 dB. However, since the value of the coupling loss is minute, it can be expected that an SPP can propagate regardless of the coupling loss even when the length of the gap exceeds 11 μm. Accordingly, the length of the gap may be flexibly selected depending on the processing situation.

Figure 8:
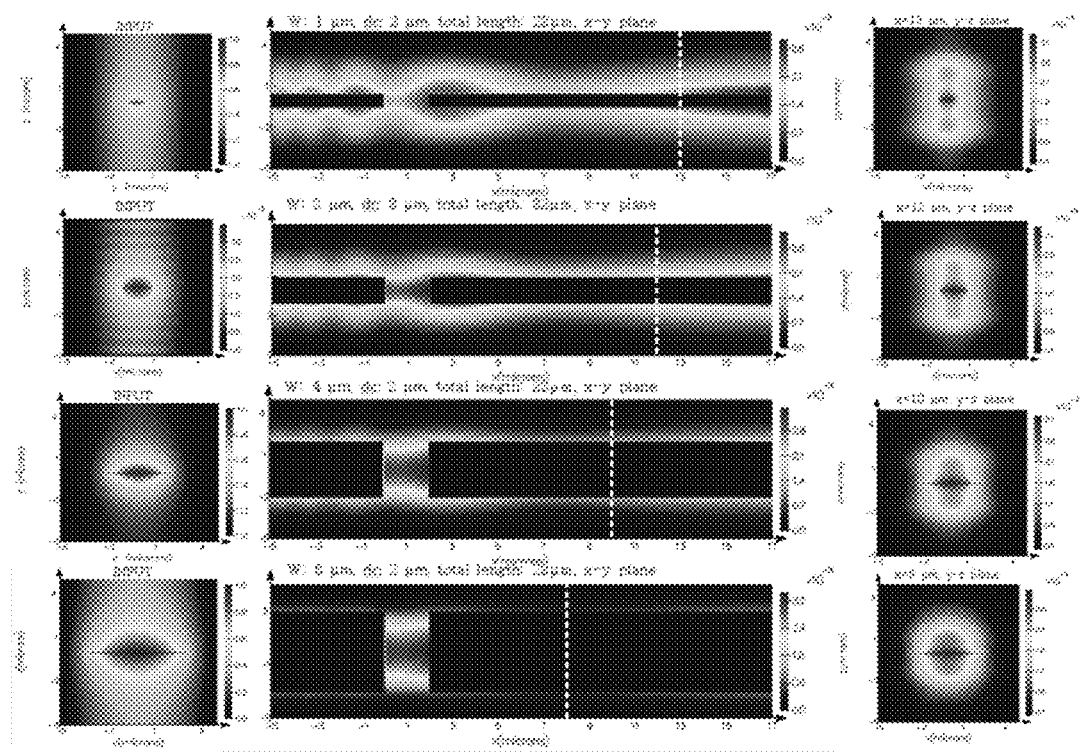
FIG. 8 shows views illustrating the results of simulating the propagation of an SPP through a gap while varying the width of a waveguide in an SPP device having an IMI structure and also including a discontinuous waveguide separated by a gap according to an embodiment of the present invention.

FIG. 8 shows views illustrating the results of simulating the propagation of an SPP through a gap while varying the width of a waveguide in an SPP device having an IMI structure and also including a discontinuous waveguide separated by a gap according to an embodiment of the present invention.

The length of a gap varied in the case of FIG. 6, whereas the propagation of an SPP was simulated when the width of a waveguide was varied in the state in which the length of a gap was fixed in the case of FIG. 8.

The material of each of the metal waveguides applied to the simulations was Au, the thickness thereof was 20 nm, the first and second lengths thereof were 5 μm and 10 μm, respectively, the length of the gap was 2 μm, the thickness and refractive index of the dielectric layer are 30 μm and 1.45, respectively, and the wavelength of incident light was 1.55 μm.

The width of the gap was selected as 1 μm, 2 μm, 4 μm, and 6 μm. In the following views, in each case, the total length of the discontinuous plasmonic device is a length obtained by adding the length of the gap to the lengths of the two metal waveguides, and thus it should be noted that the total lengths of the simulations are different from each other.

The following views show the discontinuous waveguides when viewed from the above. The optical wave input location is −5 μm, the termination location of the input-side waveguide is 0 μm, that is, an origin, and the output location of the output-side waveguide is 17 μm.

When the width of the waveguides was 1 μm, the width of the waveguides seemed to be somewhat smaller than the size of an SPP. It can be seen that an SPP come to have the same shape as an $s_0$ mode SPP, initially excited into the input-side plasmonic waveguide, after a 13 μm point on a lateral axis and thus become stable.

When the width of the waveguides was 2 μm, the size of an SPP become equal to the width of the waveguides, and an $s_0$ mode SPP was observed to be stable at a 12 μm point at a lateral axis.

When the width of the waveguides was 4 μm and 6 μm, the width of the waveguides become larger than the size of an SPP and $s_0$ mode SPPs were observed to be stable at 10 μm and 8 μm points, respectively, on a lateral axis.

Figure 9:
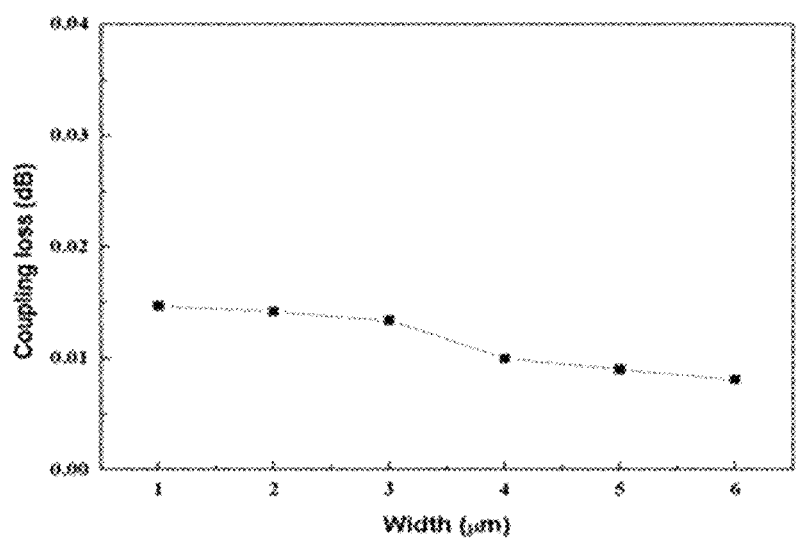
FIG. 9 is a graph illustrating coupling loss in the case of performing simulations while varying the width of waveguides in an SPP device having an IMI structure and also including a discontinuous waveguide separated by a gap according to an embodiment of the present invention.

FIG. 9 is a graph illustrating coupling loss in the case of performing simulations while varying the width of waveguides in an SPP device having an IMI structure and also including a discontinuous waveguide separated by a gap according to an embodiment of the present invention.

Referring to FIG. 9, although coupling loss is gradually improved as the width of the waveguides increases, it exhibits only negligible differences compared to the changes in the width of the waveguides because the value of the coupling loss itself is small. Accordingly, this implies that a plasmonic device may be designed using a waveguide narrower or considerable wider than the size of an SPP depending on the need and situation.

Figure 10:
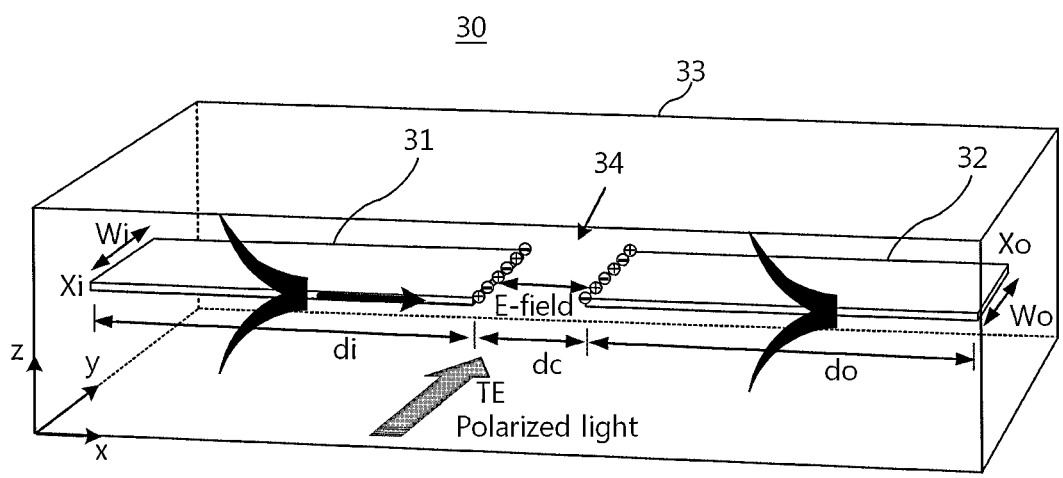
FIGS. 10 to 12 are conceptual diagrams illustrating a phenomenon in which the propagation of an SPP is obstructed by a gap when TE mode-polarized light is incident into the gap of each of discontinuous waveguides having three different structures, respectively, according to an embodiment of the present invention.
Figure 11:
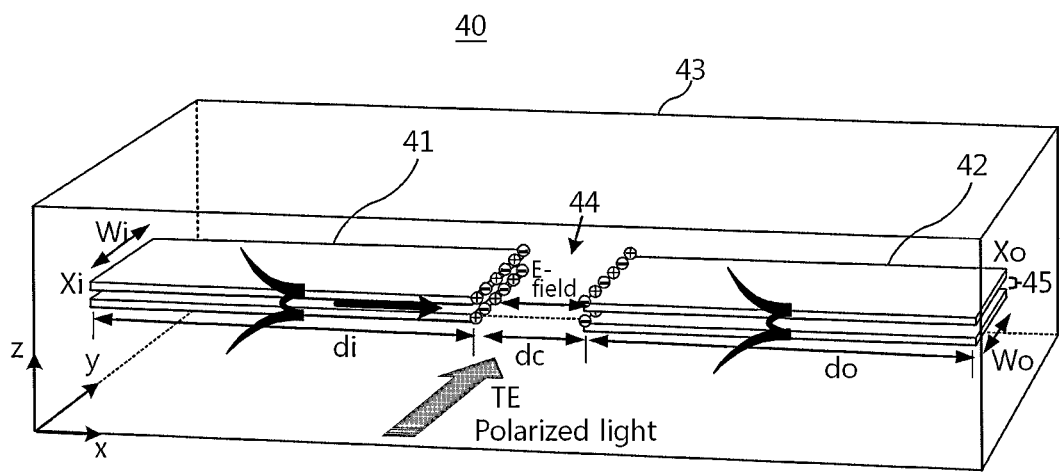
Figure 12:
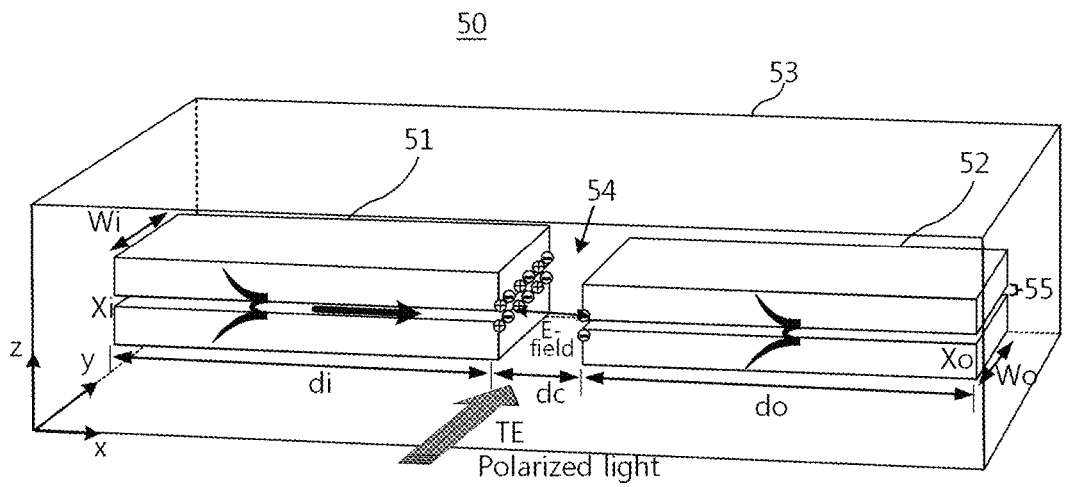

FIGS. 10 to 12 are conceptual diagrams illustrating a phenomenon in which the propagation of an SPP is obstructed by a gap when TE mode-polarized light is incident into the gap of each of discontinuous waveguides having three different structures, respectively, according to an embodiment of the present invention.

Referring to FIGS. 10 to 12, a discontinuous plasmonic device 30 having a single thin metal film (IMI) structure, a discontinuous plasmonic device 40 having a double thin metal film (IMIMI) structure, and a discontinuous plasmonic device 50 having a thick double metal (MIM) structure each have a discontinuous waveguide (31 and 32, 41 and 42, or 51 and 52) in which a gap 34, 44 or 54 is present in the middle thereof.

In these discontinuous plasmonic devices 30, 40 and 50, TE mode-polarized light is incident into the gaps 34, 44 and 54 in a direction perpendicular to an x-axis direction, that is, the propagation direction of an SPP, for example, a y-axis direction.

First, the polarization modes of an optical waveguide are described below. Methods by which light can propagate inside an optical waveguide, that is, modes in which light can propagate inside an optical waveguide, may be various. However, when light has propagated over a somewhat long distance while being reflected from the inner wall of an optical waveguide, such as an optical cable, a few modes in which any one of two fields, that is, an electric field and a magnetic field, constituting light is reflected in a direction parallel with the inner wall of the optical waveguide (in other words, in a direction perpendicular to the propagation direction of light) and, furthermore, a reflection path is a integer multiple of a half wavelength have not been significantly attenuated in spite of a lot of reflections from the inner wall of the optical waveguide, survive and become dominant modes, and the other modes are attenuated and disappear gradually.

Accordingly, it may be said that light emitted from an optical waveguide is output in one of an TE mode, that is, a mode in which the electric field of the light is perpendicular to the propagation direction of the light, and a TM mode, that is, a mode in which the magnetic field of the light is perpendicular to the propagation direction of the light.

In FIGS. 10 to 12, TE mode-polarized light is incident into the gaps in a direction perpendicular to an x-axis direction, that is, the propagation direction of an SPP, for example, a y-axis direction or any rectilinear direction in an y-z plane.

In this case, the fact that TE mode-polarized light is incident in a direction perpendicular to an x-axis direction means that the y-axis and z-axis components of the TE mode-polarized light are relatively dominant over the x-axis component thereof, but does not refer to an exact state in which an x-axis component is absolutely not present.

Since TE mode-polarized light that perpendicularly passes through a gap is light whose electric field is formed in an x-axis direction that traverses the gap, +charges and −charges are gathered on both side walls of the gap, respectively, under the influence of the electric field of the TE mode-polarized light, and these charges may form strong dipoles. For example, if +−+−+−charges are gathered along the first metal termination surface of a plasmonic waveguide at a gap start location, −+−+−+charges are gathered along the metal termination surface of a second plasmonic waveguide at a gap end location.

As described above, a surface plasmon, that is, the basis of an SPP, is the collective oscillation of free charges inside a metal. The collective oscillation of free charges essential for the propagation of an SPP is obstructed by a strong charge induction phenomenon, attributable to TE mode-polarized light, on the side walls of a gap.

Accordingly, a predetermined coupled mode SPP, that is, a TM mode electromagnetic wave excited into each of the first plasmonic waveguides 31, 41 and 51, is prevented from jumping from the corresponding gap 34, 44 or 54 into the corresponding second plasmonic waveguide 32, 42 or 52 by TE mode-polarized light.

In other words, it may be said that when TE mode-polarized light is incident onto each of the gaps 34, 44 and 54 so that an electric field is formed in parallel with the propagation direction of an SPP, the SPP cannot pass through the gap 34, 44 or 54.

In this case, the fact that the electric field of TE mode-polarized light is formed in parallel with the propagation direction of an SPP (an x-axis direction) means that the x-axis component of the electric field of the TE mode-polarized light is relatively dominant over the y-axis and z-axis components of the electric field, and does not refer to an exact state in which only the x-axis component of the electric field is present.

Meanwhile, when the incidence of the TE mode-polarized light onto each of the gaps 34, 44 and 54 is stopped, the SPP passes through the gap 34, 44 or 54 and is normally observed at the output location of the second plasmonic waveguide 32, 42 or 52.

By this, the possibility of controlling the generation of an SPP by selectively allowing and blocking the perpendicular incidence of TE mode-polarized light onto each of the gaps 34, 44 and 54 is presented.

For example, when an SPP is always excited at the input location of each of the discontinuous plasmonic devices 30, 40 and 50 and TE mode-polarized light modulated into pre-determined binary information is perpendicularly incident onto the corresponding gap 34, 44 or 54, it can be expected that an SPP modulated into the inverted binary information of the binary information of the TE mode-polarized light will be observed at the output location of the corresponding discontinuous plasmonic device 30, 40 and 50.

This enables the implementation of a plasmonic device that is capable of generating an SPP modulated into desired information.

Furthermore, when an SPP modulated into first binary information is excited at the input location of each of the discontinuous plasmonic devices 30, 40 and 50 and TE mode-polarized light modulated into predetermined second binary information is perpendicularly incident onto the corresponding gap 34, 44 or 54, it can be expected that an SPP in which original input first binary information has been modulated into switched binary information selectively blocked and allowed by the second binary information of the TE mode-polarized light will be observed at the output location of the corresponding discontinuous plasmonic device 30, 40 or 50.

This enables the implementation of a plasmonic device that functions as a switch.

Figure 13:
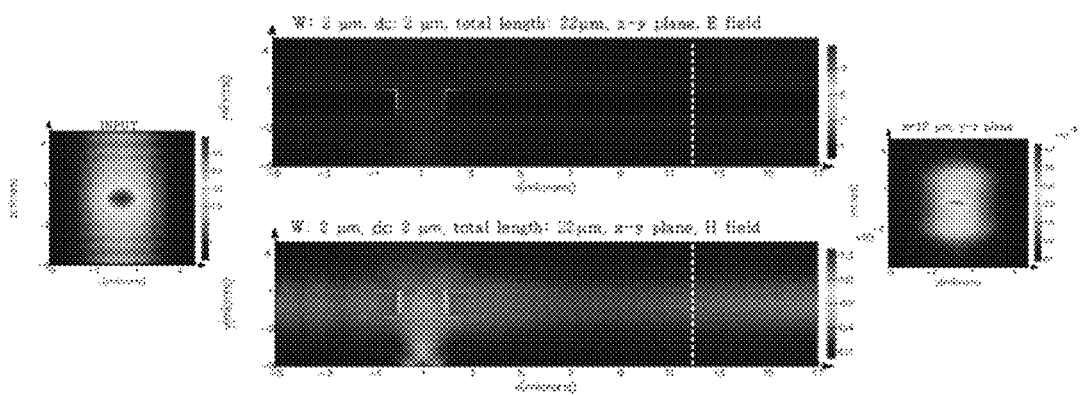
FIGS. 13 and 14 are views each illustrating the results of simulating the propagation of an SPP in a gap when TE mode-polarized light is incident into the gap of a discontinuous waveguide having an IMI structure according to an embodiment of the present invention.
Figure 14:
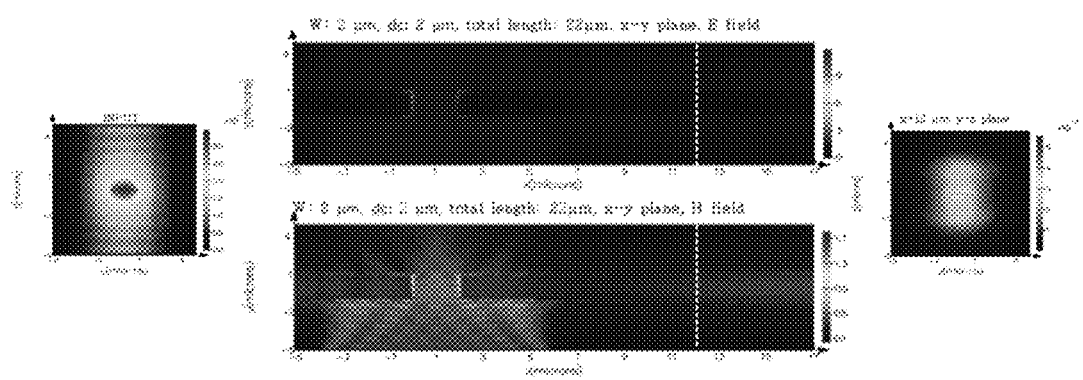

FIGS. 13 and 14 are views each illustrating the results of simulating the propagation of an SPP in a gap when TE mode-polarized light is incident into the gap of a discontinuous waveguide having an IMI structure according to an embodiment of the present invention.

The simulations were performed by a method of analyzing a TM mode SPP field distribution, detected at a discontinuous plasmonic device when TE mode-polarized light was incident into a gap between two waveguides having a predetermined length in a y-axis direction, using an FDTD analysis technique.

The material of metal waveguides applied to the simulations was Au, the width thereof was 2 µm, the thickness thereof was 20 nm, the first and second length thereof were 5 µm and 10 µm, respectively, the length dc of the gap was 2 µm, the thickness and refractive index of the upper and lower dielectric layers were 30 µm and 1.45, respectively, the wavelength of incident light used to excite an SPP was 1.55 µm, the size of the mode thereof was 10.3 µm×10.3 µm, the wavelength of TE mode-polarized light was 1.55 µm, and the size of the mode thereof was 2 µm×10.3 µm in the case of FIG. 13 and 10.3 µm×10.3 µm in the case of FIG. 14.

Referring to FIG. 13 in which the width of TE mode-polarized light is relatively small, it can be seen that, while stable SPPs appeared at the input location and the point 12 μm away from the gap start location on the second plasmonic waveguide in FIG. 6, the excitation of an SPP was not obstructed at an input location but an SPP having an appropriate shape was not observed at a 12 μm point on the second plasmonic waveguide of FIG. 13, that is, the propagation of an SPP was blocked, due to a strong dipole generated along the opposite side walls of the gap.

Furthermore, the magnitude of normalized transmission detected at an output location due to the incidence of TE mode-polarized light was about 0.91 when polarized light was not incident, and decreased to about 0.61 when TE mode-polarized light was incident.

Referring to FIG. 14 in which the width of TE mode-polarized light is relatively large, it can be seen that the excitation of an SPP was not obstructed at an input location and an SPP having an appropriate shape was absolutely not observed at a 12 μm point on a second plasmonic waveguide, that is, the propagation of an SPP was blocked, due to a strong dipole generated along the opposite side walls of the gap.

Furthermore, the magnitude of normalized transmission detected at an output location due to the incidence of TE mode-polarized light was about 0.91 when polarized light was not incident, and decreased to about 0.26 when TE mode-polarized light was incident. When compared to the case of FIG. 13, it can be seen that although the power of an electromagnetic wave at the output location considerably decreased as the intensity of TE mode-polarized light increases, the propagation of an SPP could be blocked via the gap even when the intensity of the TE mode-polarized light was weak.

Figure 15:
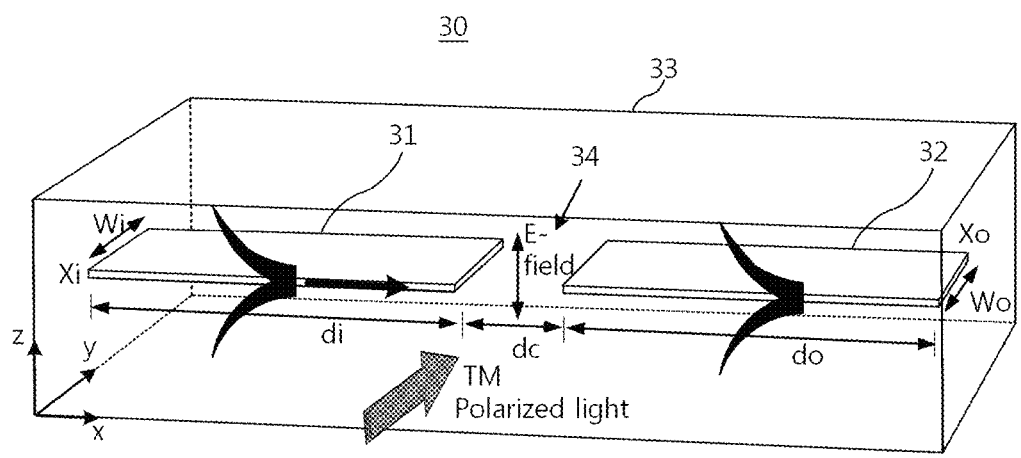
FIGS. 15 to 17 are conceptual diagrams illustrating a phenomenon in which an SPP propagates while pumping across a gap when TM mode-polarized light is incident into the gap of each of discontinuous waveguides having three different structures, respectively, according to an embodiment of the present invention.
Figure 16:
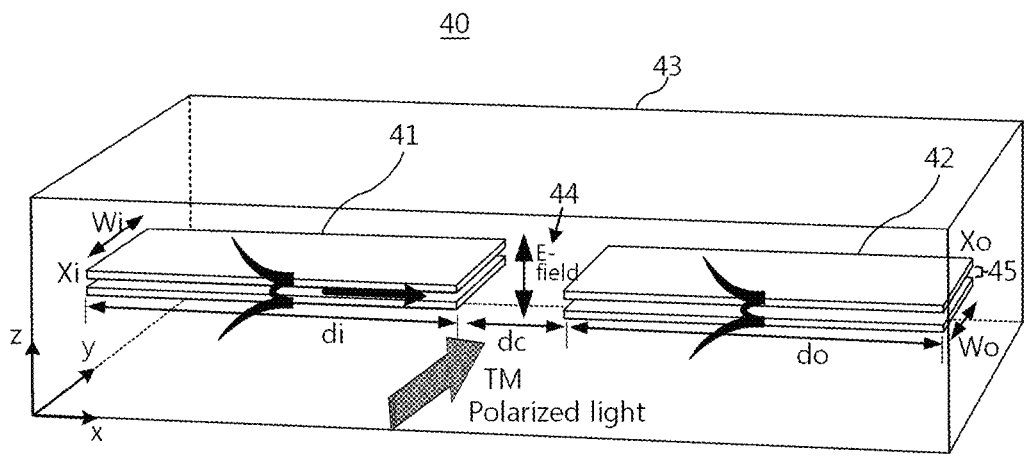
Figure 17:
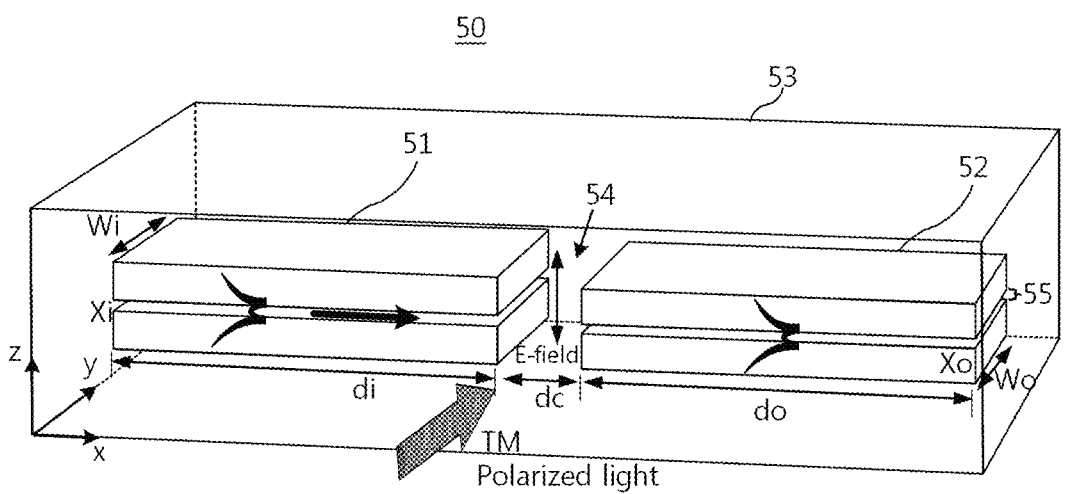

FIGS. 15 to 17 are conceptual diagrams illustrating a phenomenon in which an SPP propagates while pumping across a gap when TM mode-polarized light is incident into the gap of each of discontinuous waveguides having three different structures, respectively, according to an embodiment of the present invention.

Referring to FIGS. 15 to 17, TM mode-polarized light is incident into the gap in a direction perpendicular to an x-axis direction, that is, the propagation direction of an SPP, for example, a y-axis direction or any rectilinear direction in a y-z plane.

In this case, the fact that TM mode-polarized light is incident in a direction perpendicular to an x-axis direction means that the y-axis and z-axis components of the TM mode-polarized light are relatively dominant over the x-axis component thereof, but does not refer to an exact state in which an x-axis component is absolutely not present.

The TM mode-polarized light that perpendicularly passes through the gap is light whose magnetic field appears in an x-axis direction that traverses the gap and whose electric field is formed to perpendicularly pass through the plane of the gap. A phenomenon in which charges are gathered on both side walls of the gap is not generated by the TM mode-polarized light, and the collective oscillation of free charges essential for the propagation of an SPP is not significantly obstructed by the TM mode-polarized light.

However, since the magnetic field distribution of an SPP in the gap area is influenced by the TM mode-polarized light, energy used to excite an SPP into each of the second plasmonic waveguides 32, 42 and 52 is reduced.

Accordingly, a predetermined coupled mode SPP, that is, the electromagnetic wave of an TM mode excited into each of the first plasmonic waveguides 31, 41 and 51, may appear in a corresponding second plasmonic waveguide 32, 42 or 52 at an intensity somewhat attenuated by the incidence of TM mode-polarized light onto a corresponding gap 34, 44 or 54.

In other words, when TM mode-polarized light whose electric field is formed in a plane perpendicular to the propagation direction of an SPP is incident into the gap 34, 44 or 54, the SPP passes through the gap 34, 44 or 54 while being attenuated.

In this case, the fact that the electric field of TM mode-polarized light is formed in a plane perpendicular to the propagation direction of an SPP means that the x-axis component of the TM mode-polarized light are relatively negligible compared to the y-axis and z-axis components thereof, but does not refer to an exact state in which an x-axis component is absolutely not present.

Meanwhile, when the incidence of the TM mode-polarized light into the gap 34, 44 or 54 is stopped, the SPP passes through the gap 34, 44 or 54 and is then observed at an non-attenuated intensity at the output location of the second plasmonic waveguide 32, 42 or 52.

By this, the possibility of controlling the intensity of an SPP by selectively allowing and blocking the perpendicular incidence of TM mode-polarized light onto each of the gaps 34, 44 and 54 is presented.

FIGS. 18 and 19 are views each illustrating the results of simulating the propagation of an SPP in a gap in the case of allowing TM mode-polarized light to be incident into the gap of a discontinuous waveguide having an IMI structure while varying the size of the mode according to an embodiment of the present invention.

The simulations were performed by a method of analyzing a TM mode SPP field distribution, detected at a discontinuous plasmonic device when TM mode-polarized light was incident into a gap between two waveguides having a predetermined length in a y-axis direction, using an FDTD analysis technique.

The material of metal waveguides applied to the simulations was Au, the width thereof was 2 μm, the thickness thereof was 20 nm, the first and second length thereof were 5 μm and 10 μm, respectively, the length dc of the gap was 2 μm, the thickness and refractive index of the upper and lower dielectric layers were 30 μm and 1.45, respectively, the wavelength of incident light used to excite an SPP was 1.55 μm, the size of the mode thereof was 10.3 μm×10.3 μm, the wavelength of TE mode-polarized light was 1.55 μm, and the size of the mode thereof was 2 μm×10.3 μm in the case of FIG. 18 and 10.3 μm×10.3 μm in the case of FIG. 19.

Referring to FIG. 18 in which the width of TM mode-polarized light is relatively small, the excitation of an SPP was not obstructed at an input location and an $s_0$ mode SPP was observed at the same locations on the second plasmonic waveguide of FIG. 18 in the same manner as stable SPPs appeared at the input location and the point 12 μm away from the gap start location on the second plasmonic waveguide in FIG. 6.

However, since the magnetic field distribution of an SPP in the gap area is influenced by TM mode-polarized light, the magnitude of normalized transmission detected at the output location was about 0.91 when the polarized light was not incident, and decreased to about 0.61 when the TM mode-polarized light was incident.

Referring to FIG. 19 in which the width of TM mode-polarized light is relatively large, it can be seen that the excitation of an SPP was not obstructed at an input location and an SPP having an appropriate shape was not observed at a 12 μm point on a second plasmonic waveguide, that is, the propagation of an SPP was blocked.

Furthermore, the magnitude of normalized transmission detected at an output location due to the incidence of TE mode-polarized light was about 0.91 when polarized light was not incident, and decreased to about 0.26 when TM mode-polarized light was incident. When compared to the case of FIG. 18, it can be seen that the power of an electromagnetic wave at the output location considerably decreased as the intensity of TM mode-polarized light increased, and thus it is possible to control the level of attenuation of an SPP while the SPP is passing through the gap.

Figure 20:
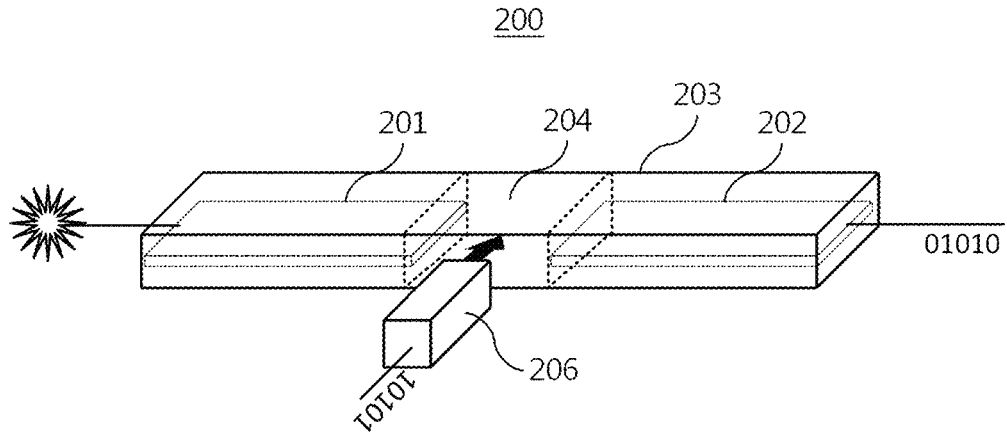
FIG. 20 is a conceptual diagram illustrating a digital SPP switching apparatus according to an embodiment of the present invention.

FIG. 20 is a conceptual diagram illustrating a digital SPP switching apparatus 200 according to an embodiment of the present invention.

Referring to FIG. 20, the digital SPP switching apparatus 200 may include first and second plasmonic waveguides 201 and 202, a dielectric layer 203, and a TE mode polarization light source device 206.

First, the first plasmonic waveguide 201 is implemented using a strip-shaped metal material having at least one pair of first metal surfaces forming at least one pair of first metal-dielectric interfaces along with the dielectric layer 203 so that a predetermined coupled mode SPP can propagate. The metal strip constituting the first plasmonic waveguide 201 extends from an input location, at which an SPP is input, to a gap start location over a first length along the propagation direction of the excited SPP while having a predetermined width (for example, Wi).

Next, the second plasmonic waveguide 202 is implemented using a strip-shaped metal material having at least one pair of second metal surfaces forming at least one pair of second metal-dielectric interfaces in planes identical to those of the at least one pair of first metal-dielectric interfaces of the first plasmonic waveguide 201 so that a coupled mode SPP can propagate. Furthermore, the metal strip constituting the second plasmonic waveguide 202 extends from a gap end location, spaced apart from the gap start location by the gap length dc along the propagation direction of an SPP, to an SPP output location Xo over a second length along the propagation direction of the SPP while having a predetermined width (for example, Wo).

The dielectric layer 203 is implemented using a dielectric material that can internally distribute the magnetic field of a TM mode SPP in an area that comes into contact with the at least one pair of first metal surfaces and at least one pair of second metal surfaces of the first and second plasmonic waveguides 201 and 202 on the first and second metal-dielectric interfaces and an area that extends from the gap start location to the gap end location.

The dielectric constant of an area in which the dielectric layer 203 comes into contact with the first and second metal surfaces may be the same as or different from the dielectric constant of the area of the gap depending on the embodiment.

The TE mode polarization light source device 206 may allows TE mode-polarized light to be incident into the gap 204 so that an electric field is formed in a direction parallel with the propagation direction of an SPP.

Furthermore, the TE mode polarization light source device 206 may emit and or may not emit TE mode-polarized light so that the TE mode-polarized light is or is not incident into the gap 204, depending the inverted symbol of an input symbol desired to be modulated.

In response to a situation in which the excited SPP is selectively passed and blocked by the modulated TE mode-polarized light incident into the gap 204, the second plasmonic waveguide 202 may output a digital SPP signal, modulated in accordance with the input symbol, at an output location.

Accordingly, the digital SPP switching apparatus 200 may generate a coupled mode SPP binary-modulated in accordance with the input symbol.

For example, when the SPP is excited into 11111 at the input location of the digital SPP switching apparatus 200 and also the TE mode polarization light source device 206 allows TE mode-polarized light modulated into predetermined binary information, for example, 10101, to be vertically incident into the gap 204, it can be expected that an SPP modulated into the inverted binary information of the binary information of the TE mode-polarized light, that is, 01010, is obtained at the output location of the digital SPP switching apparatus 200.

Furthermore for example, when an SPP modulated to the first binary information 11001001 is excited at the input location of the digital SPP switching apparatus 200 and also the TE mode polarization light source device 206 allows TE mode-polarized light, modulated into predetermined second binary information, for example, 11110000, is vertically incident into the gap 204, an SPP signal in which the original input first binary information 11001001 has been modulated into binary information, that is, 00001001, selectively blocked and passed by the second binary information 1111000 of the TE mode-polarized light will be observed at the output location of the digital SPP switching apparatus 200.

Figure 21:
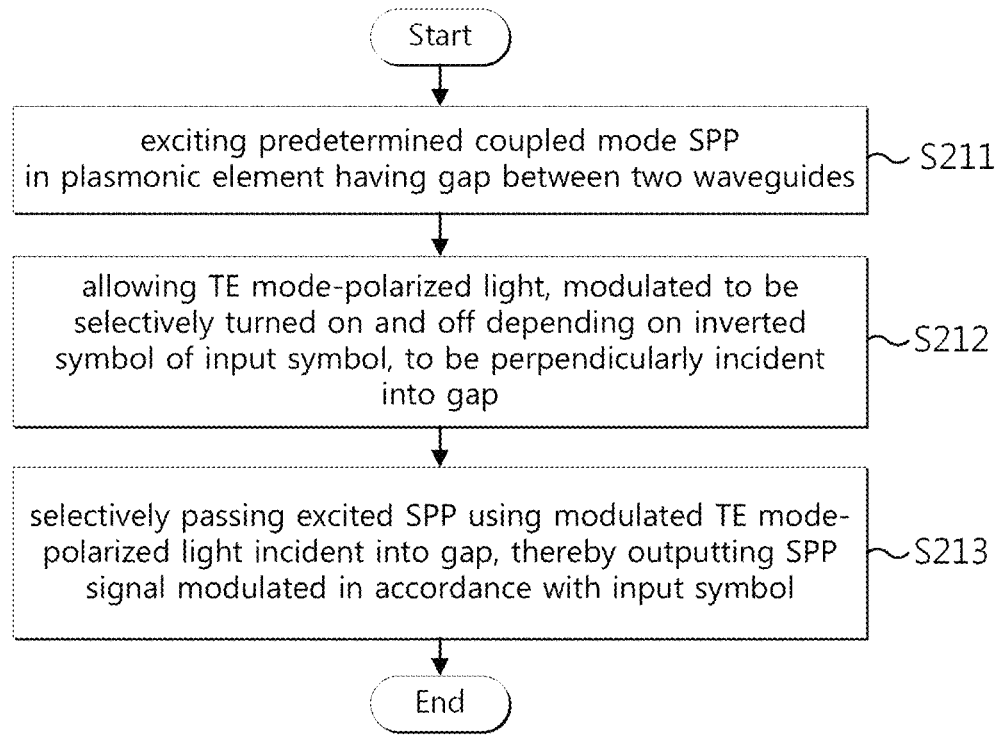
FIG. 21 is a flowchart illustrating a digital SPP switching method according to an embodiment of the present invention.

FIG. 21 is a flowchart illustrating a digital SPP switching method according to an embodiment of the present invention.

At step S211, a predetermined coupled mode excited SPP is generated in a first plasmonic waveguide by exciting a TM mode electromagnetic wave at the input location of the first plasmonic waveguide of a plasmonic device including the first plasmonic waveguide having a first length and a second plasmonic waveguide having a second length which is spaced apart from the first plasmonic waveguide by a gap having a predetermined length along the same direction.

At step S212, an optical signal modulated by selectively emitting light and blocking light depending on the inverted symbol of a predetermined input symbol is TE mode-polarized so that an electric field is formed in parallel with the propagation direction of the excited SPP, and is then allowed to be perpendicularly incident into the gap.

At step S213, in response to a situation in which the excited SPP is selectively passed and blocked by the modulated TE mode-polarized light incident into the gap, a digital SPP signal modulated in accordance with the input symbol may be output at the output location of the second plasmonic waveguide.

Figure 22:
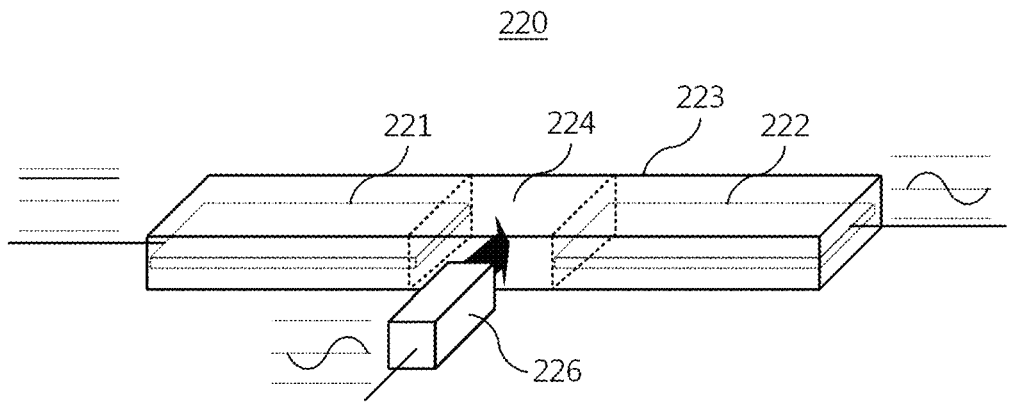
FIG. 22 is a conceptual diagram illustrating an analog SPP signal generation apparatus according to another embodiment of the present invention.

FIG. 22 is a conceptual diagram illustrating an analog SPP signal generation apparatus 220 according to another embodiment of the present invention.

Referring to FIG. 22, the analog SPP signal generation apparatus 220 may include first and second plasmonic waveguides 221 and 222, a dielectric layer 223, and a TM mode polarization light source device 226.

First, the first plasmonic waveguide 221 is implemented using a strip-shaped metal material having at least one pair of first metal surfaces forming at least one pair of first metal-dielectric interfaces along with the dielectric layer 223 so that a predetermined coupled mode SPP can propagate. The metal strip constituting the first plasmonic waveguide 221 extends from an input location Xi, at which an SPP is input, to a gap start location over a first length along the propagation direction of the excited SPP while having a predetermined width (for example, Wi).

Next, the second plasmonic waveguide 222 is implemented using a strip-shaped metal material having at least one pair of second metal surfaces forming at least one pair of second metal-dielectric interfaces in planes identical to those of the at least one pair of first metal-dielectric interfaces of the first plasmonic waveguide 221 so that a coupled mode SPP can propagate. Furthermore, the metal strip constituting the second plasmonic waveguide 222 extends from a gap end location, spaced apart from the gap start location by the gap length dc along the propagation direction of an SPP, to an SPP output location Xo over a second length along the propagation direction of the SPP while having a predetermined width (for example, Wo).

The dielectric layer 223 is implemented using a dielectric material that can internally distribute the magnetic field of a TM mode SPP in an area that comes into contact with the at least one pair of first metal surfaces and at least one pair of second metal surfaces of the first and second plasmonic waveguides 221 and 222 on the first and second metal-dielectric interfaces and an area that extends from the gap start location to the gap end location.

The dielectric constant of an area in which the dielectric layer 223 comes into contact with the first and second metal surfaces may be the same as or different from the dielectric constant of the area of the gap depending on the embodiment.

The TM mode polarization light source device 226 may allows TM mode-polarized light to be incident into the gap 224 so that an electric field is formed in a direction parallel with the propagation direction of an SPP.

Furthermore, the TM mode polarization light source device 226 may emit TM mode-polarized light so that TM mode-polarized light whose intensity has been controlled in accordance with a predetermined analog control signal can be incident into the gap 224.

In response to a situation in which the intensity of the excited SPP is controlled by the controlled TM mode-polarized light incident into the gap 224, the second plasmonic waveguide 222 may output an SPP signal, whose intensity is controlled in accordance with an analog control signal, at its output location.

For example, with regard to an excited SPP mode having a specific size, an output SPP signal is relatively highly attenuated when the intensity of TM mode-polarized light is high, whereas an output SPP signal is relatively little attenuated and then output when the intensity of TM mode-polarized light is low.

Accordingly, the analog SPP signal generation apparatus 220 may generate a coupled mode SPP whose intensity is controlled in accordance with an analog control signal.

Figure 23:
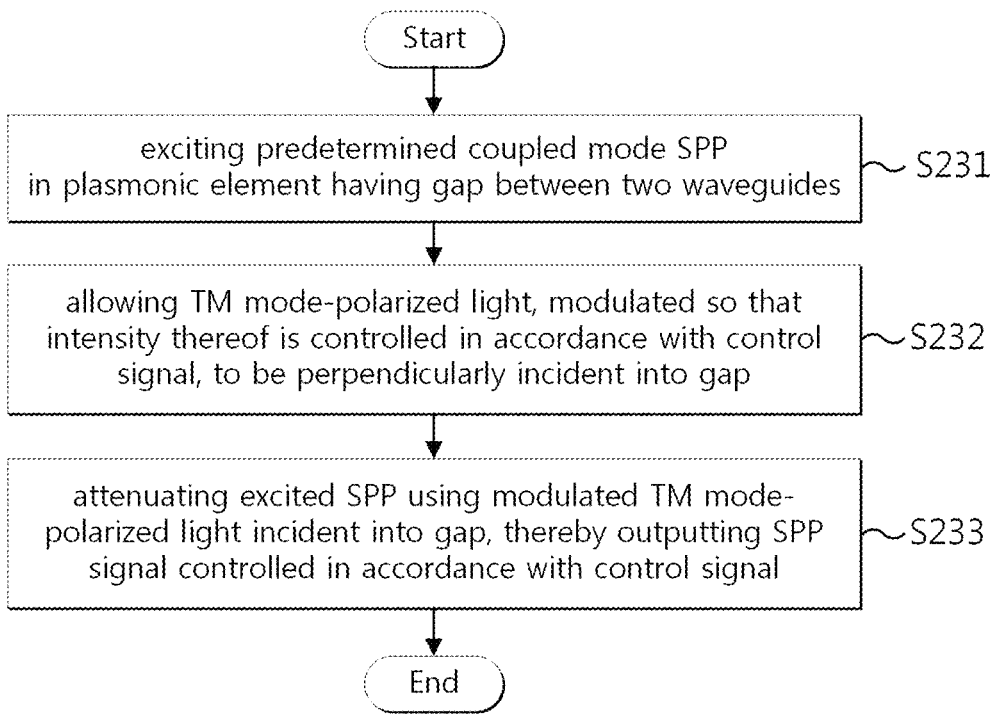
FIG. 23 is a flowchart illustrating an analog SPP signal generation method according to another embodiment of the present invention.

FIG. 23 is a flowchart illustrating an analog SPP signal generation method according to another embodiment of the present invention.

At step S231, a predetermined coupled mode excited SPP is generated in a first plasmonic waveguide by exciting a TM mode electromagnetic wave at the input location of the first plasmonic waveguide of a plasmonic device including the first plasmonic waveguide having a first length and a second plasmonic waveguide having a second length which is spaced apart from the first plasmonic waveguide by a gap having a predetermined length along the same direction.

At step S232, an optical signal whose intensity has been controlled in accordance with a predetermined analog control signal is TM mode-polarized so that an electric field is formed in a direction perpendicular to the propagation direction of the excited SPP, and is then allowed to be perpendicularly incident into the gap.

At step S233, in response to a situation in which the excited SPP is attenuated by the controlled TM mode-polarized light incident into the gap, an analog SPP signal controlled in accordance with a control signal may be output at the output location of the second plasmonic waveguide.

In accordance with the SPP signal generation apparatus and method of the present invention, an SPP signal generation device having a size within tens of nano meters and very low power consumption can be fabricated so that it can be applied to a nano surface plasmonic and photonic integrated device.

In accordance with the SPP signal generation apparatus and method of the present invention, an SPP signal modulated to have desired information can be generated.

In accordance with the SPP signal generation apparatus and method of the present invention, a binary SPP signal can be generated.

The advantages of the present invention are not limited to the above-described advantages, and advantages that have not been mentioned above will be readily understood by those skilled in the art based on the above detailed description.

Although the present invention has been described with reference to the limited embodiments and drawings above, the present invention is not limited to the embodiments, and it will be apparent to those having ordinary knowledge in the art to which the present invention pertains that various modifications and variations can be made based on the above description. Accordingly, the spirit of the present invention should be defined based on only the following claims, and all modifications and variations equivalent to the claims should be construed as falling within the scope of the spirit of the present invention.

What is claimed is:

1. A plasmonic device, comprising:
    a first plasmonic waveguide made of a strip-shaped metal material having at least one pair of first metal surfaces forming at least one pair of first metal-dielectric interfaces along with a dielectric layer so that a predetermined coupled mode surface plasmon polariton (SPP) can propagate, and configured to extend from an input location, at which an SPP is input, to a gap start location over a first length along a propagation direction of an excited SPP while having a predetermined width; and
    a second plasmonic waveguide made of a strip-shaped metal material having at least one pair of second metal surfaces forming at least one pair of second metal-dielectric interfaces in planes identical to those of the at least one pair of first metal-dielectric interfaces of the first plasmonic waveguide so that the coupled mode SPP can propagate, and configured to extend from a gap end location, spaced apart from the gap start location by a length of a gap along the propagation direction of the SPP, to an SPP output location over a second length along the propagation direction of the SPP while having a predetermined width;
    wherein the dielectric layer is made of a dielectric material that is capable of internally distributing a magnetic field of a TM mode SPP in an area that comes into contact with the at least one pair of first metal surfaces and at least one pair of second metal surfaces of the first and second plasmonic waveguides on the first and second metal-dielectric interfaces and an area that extends from the gap start location to the gap end location.

2. The plasmonic device of claim 1, wherein the first and second plasmonic waveguides are formed in one structure selected from the group consisting of an insulator-metal-insulator (IMI) structure, a metal-insulator-metal (MIM) structure and an insulator-metal-insulator-metal-insulator (IMIMI) structure.

3. The plasmonic device of claim 1, wherein the first and second plasmonic waveguides are made of any one metal or an alloy of two or more metals selected from the group consisting of noble metals and transition metals.

4. The plasmonic device of claim 1, wherein the dielectric layer is made of at least one dielectric material selected from the group consisting of Si, SiO$_2$, Si$_3$N$_4$ and a polymer.

5. The plasmonic device of claim 1, wherein the dielectric layer is configured such that a dielectric constant of the area that comes into contact with the at least one pair of first metal surfaces and at least one pair of second metal surfaces of the first and second plasmonic waveguides on the first and second metal-dielectric interfaces is different from a dielectric constant of the area that extends from the gap start location to the gap end location.

6. A plasmonic device, comprising:
a first plasmonic waveguide made of a strip-shaped metal material having at least one pair of first metal surfaces forming at least one pair of first metal-dielectric interfaces along with a dielectric layer so that a predetermined coupled mode SPP can propagate, and configured to extend from an input location, at which an SPP is input, to a gap start location over a first length along a propagation direction of an excited SPP while having a predetermined width;
a second plasmonic waveguide made of a strip-shaped metal material having at least one pair of second metal surfaces forming at least one pair of second metal-dielectric interfaces in planes identical to those of the at least one pair of first metal-dielectric interfaces of the first plasmonic waveguide so that the coupled mode SPP can propagate, and configured to extend from a gap end location, spaced apart from the gap start location by a length of a gap along the propagation direction of the SPP, to an SPP output location over a second length along the propagation direction of the SPP while having a predetermined width; and
a polarization light source device configured to allow light, polarized in a desired polarization mode, to be incident into the gap;
wherein the dielectric layer is made of a dielectric material that is capable of internally distributing a magnetic field of a TM mode SPP in an area that comes into contact with the at least one pair of first metal surfaces and at least one pair of second metal surfaces of the first and second plasmonic waveguides on the first and second metal-dielectric interfaces and an area that extends from the gap start location to the gap end location.

7. An SPP switching apparatus, comprising:
a first plasmonic waveguide made of a strip-shaped metal material having at least one pair of first metal surfaces forming at least one pair of first metal-dielectric interfaces along with a dielectric layer so that a predetermined coupled mode SPP can propagate, and configured to extend from an input location, at which an SPP is input, to a gap start location over a first length along a propagation direction of an excited SPP while having a predetermined width;
a second plasmonic waveguide made of a strip-shaped metal material having at least one pair of second metal surfaces forming at least one pair of second metal-dielectric interfaces in planes identical to those of the at least one pair of first metal-dielectric interfaces of the first plasmonic waveguide so that the coupled mode SPP can propagate, and configured to extend from a gap end location, spaced apart from the gap start location by a length of a gap along the propagation direction of the SPP, to an SPP output location over a second length along the propagation direction of the SPP while having a predetermined width; and
a TE mode polarization light source device configured to allow polarized light to be incident into the gap so that an electric field is formed in a direction parallel with the propagation direction of the SPP;
wherein the dielectric layer is made of a dielectric material that is capable of internally distributing a magnetic field of a TM mode SPP in an area that comes into contact with the at least one pair of first metal surfaces and at least one pair of second metal surfaces of the first and second plasmonic waveguides on the first and second metal-dielectric interfaces and an area that extends from the gap start location to the gap end location.

8. The apparatus of claim 7, wherein the TE mode polarization light source device operates to emit or block TE mode-polarized light so that the TE mode-polarized light is or is not incident into the gap depending on an inverted symbol of an input symbol desired to be modulated.

9. The apparatus of claim 8, wherein the second plasmonic waveguide outputs an SPP signal, modulated in accordance with the input symbol, at its output location in response to a situation in which the SPP excited in the first plasmonic waveguide is passed or blocked by the modulated TE mode-polarized light incident into the gap.

10. The apparatus of claim 7, wherein the first and second plasmonic waveguides are formed in one structure selected from the group consisting of an IMI structure, an MIM structure and an IMIMI structure.

11. The apparatus of claim 7, wherein the first and second plasmonic waveguides are made of any one metal or an alloy of two or more metals selected from the group consisting of noble metals and transition metals.

12. The apparatus of claim 7, wherein the dielectric layer is made of at least one dielectric material selected from the group consisting of Si, SiO$_2$, Si$_3$N$_4$ and a polymer.

13. The apparatus of claim 7, wherein the dielectric layer is configured such that a dielectric constant of the area that comes into contact with the at least one pair of first metal surfaces and at least one pair of second metal surfaces of the first and second plasmonic waveguides on the first and second metal-dielectric interfaces is different from a dielectric constant of the area that extends from the gap start location to the gap end location.

14. An apparatus for generating an SPP signal, comprising:
a first plasmonic waveguide made of a strip-shaped metal material having at least one pair of first metal surfaces forming at least one pair of first metal-dielectric interfaces along with a dielectric layer so that a predetermined coupled mode SPP can propagate, and configured to extend from an input location, at which an SPP is input, to a gap start location over a first length along a propagation direction of an excited SPP while having a predetermined width;
a second plasmonic waveguide made of a strip-shaped metal material having at least one pair of second metal surfaces forming at least one pair of second metal-dielectric interfaces in planes identical to those of the at least one pair of first metal-dielectric interfaces of the first plasmonic waveguide so that the coupled mode SPP can propagate, and configured to extend from a gap end location, spaced apart from the gap start location by a length of a gap along the propagation direction of the SPP, to an SPP output location over a second length along the propagation direction of the SPP while having a predetermined width; and a TM mode polarization light source device configured to allow TM-mode polarized light to be incident into the gap so that an electric field is formed in a direction perpendicular to the propagation direction of the SPP;

wherein the dielectric layer is made of a dielectric material that is capable of internally distributing a magnetic field of a TM mode SPP in an area that comes into contact with the at least one pair of first metal surfaces and at least one pair of second metal surfaces of the first and second plasmonic waveguides on the first and second metal-dielectric interfaces and an area that extends from the gap start location to the gap end location.

15. The apparatus of claim 14, wherein the TM mode polarization light source device operates to emit TM mode-polarized light in accordance with a predetermined control signal so that TM mode-polarized light whose intensity has been controlled is incident into the gap.

16. The apparatus of claim 15, wherein the second plasmonic waveguide outputs an SPP signal, whose intensity is controlled in accordance with the control signal, at its output location in response to a situation in which an intensity of the SPP excited in the first plasmonic waveguide is controlled by the controlled TM mode-polarized light incident into the gap.

17. The apparatus of claim 14, wherein the first and second plasmonic waveguides are formed in one structure selected from the group consisting of an IMI structure, an MIM structure and an IMIMI structure.

18. The apparatus of claim 14, wherein the first and second plasmonic waveguides are made of any one metal or an alloy of two or more metals selected from the group consisting of noble metals and transition metals.

19. The apparatus of claim 14, wherein the dielectric layer is made of at least one dielectric material selected from the group consisting of Si, $SiO_2$, $Si_3N_4$ and a polymer.

20. The apparatus of claim 14, wherein the dielectric layer is configured such that a dielectric constant of the area that comes into contact with the at least one pair of first metal surfaces and at least one pair of second metal surfaces of the first and second plasmonic waveguides on the first and second metal-dielectric interfaces is different from a dielectric constant of the area that extends from the gap start location to the gap end location.

21. A method of generating an SPP signal, comprising:

in a plasmonic device including a first plasmonic waveguide having a first length and a second plasmonic waveguide having a second length and spaced apart from the first plasmonic waveguide by a gap having a predetermined length along a same direction, generating a predetermined coupled mode excited SPP in the first plasmonic waveguide by exciting a TM mode electromagnetic wave at an input location of the first plasmonic waveguide;

TE mode-polarizing an optical signal, modulated by selectively emitting and blocking light depending on an inverted symbol of a predetermined input symbol so that an electric field is formed in parallel with the propagation direction of the excited SPP, and then allowing the TE mode-polarized optical signal to be perpendicularly incident into the gap; and outputting an SPP signal, modulated in accordance with the input symbol, at an output location of the second plasmonic waveguide, in response to a situation in which the excited SPP is selectively passed and blocked by the modulated TE mode-polarized light incident into the gap.

22. A method of generating an SPP signal, comprising:

in a plasmonic device including a first plasmonic waveguide having a first length and a second plasmonic waveguide having a second length and spaced apart from the first plasmonic waveguide by a gap having a predetermined length along a same direction, generating a predetermined coupled mode excited SPP in the first plasmonic waveguide by exciting a TM mode electromagnetic wave at an input location of the first plasmonic waveguide;

TM mode-polarizing an optical signal modulated by controlling an intensity of the optical signal in accordance with a predetermined control signal so that an electric field is formed a direction perpendicular to a propagation direction of the excited SPP, and then allowing the TM mode-polarized optical signal to be perpendicularly incident into the gap; and outputting an SPP signal controlled in accordance with the control signal at an output location of the second plasmonic waveguide in response to a situation in which the excited SPP is attenuated by the controlled TM mode-polarized light incident into the gap.

\* \* \* \* \*